US012548915B2

(12) United States Patent
Fernandez et al.

(10) Patent No.: US 12,548,915 B2
(45) Date of Patent: Feb. 10, 2026

(54) DEPLOYABLE ANTENNA REFLECTOR

(71) Applicant: United States of America as represented by the Administrator of NASA, Washington, DC (US)

(72) Inventors: Juan M. Fernandez, Norfolk, VA (US); Andrew F. Paddock, Newport News, VA (US); Kevin DeMarco, Yorktown, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 18/606,423

(22) Filed: Mar. 15, 2024

(65) Prior Publication Data

US 2024/0313418 A1 Sep. 19, 2024

Related U.S. Application Data

(60) Provisional application No. 63/452,712, filed on Mar. 17, 2023, provisional application No. 63/452,713, filed on Mar. 17, 2023.

(51) Int. Cl.

| | |
|---|---|
| ***H01Q 15/20*** | (2006.01) |
| ***H01Q 1/28*** | (2006.01) |

(Continued)

(52) U.S. Cl.

CPC ............ *H01Q 15/20* (2013.01); *H01Q 1/288* (2013.01); *H01Q 15/148* (2013.01); *H01Q 15/16* (2013.01)

(58) Field of Classification Search

CPC ........ H01Q 1/288; H01Q 15/161; H01Q 1/08; H01Q 15/162; H01Q 15/20; H01Q 1/1235;

(Continued)

(56) References Cited

U.S. PATENT DOCUMENTS

| | | |
|---|---|---|
| 2,234,993 A | 3/1941 | Vernon et al. |
| 3,174,851 A | 3/1965 | Buehler |

(Continued)

FOREIGN PATENT DOCUMENTS

| | | |
|---|---|---|
| EP | 1501424 B1 | 6/2018 |
| JP | 4741230 | 8/2011 |

(Continued)

OTHER PUBLICATIONS

Annette M. Schmidt, "The Synthesis of Magnetic Core-Shell Nanoparticles by Surface-Initiated Ring-Opening Polymerization of ε-Caprolactone," Macromolecular Rapid Communications, 2005, pp. 93-97, vol. 26.

(Continued)

*Primary Examiner* — Wei (Victor) Y Chan

(74) *Attorney, Agent, or Firm* — M. Bruce Harper; Trenton J. Roche; Robin W. Edwards

(57) ABSTRACT

Self-deploying reflector array architectures include stacked multiple panels attached to a central panel by sets of heat actuated flexible hinges on their non-functional sides create surface of revolution, cylindrical and flat reflector arrays in accordance with panel curvature. Robotic in-space assembly of multiple smaller arrays allows for creation of reflector array of 10 or more meters to support S-band and above RF (≥2 GHz) transmission.

16 Claims, 20 Drawing Sheets

(51) Int. Cl.
*H01Q 15/14* (2006.01)
*H01Q 15/16* (2006.01)

(58) Field of Classification Search
CPC .......... H01Q 3/46; H01Q 19/19; H01Q 1/125; H01Q 15/14; H01Q 15/148
See application file for complete search history.

(56) References Cited

U.S. PATENT DOCUMENTS

| | | | | |
|---|---|---|---|---|
| 5,863,988 | A | 1/1999 | Hashimoto et al. | |
| 6,104,358 | A * | 8/2000 | Parker | F24S 23/71 343/915 |
| 6,225,965 | B1 * | 5/2001 | Gilger | H01Q 15/168 343/915 |
| 6,300,464 | B2 | 10/2001 | Morijiri et al. | |
| 6,344,835 | B1 | 2/2002 | Allen et al. | |
| 7,710,348 | B2 | 5/2010 | Taylor et al. | |
| 7,743,835 | B2 | 6/2010 | Willauer | |
| 7,832,490 | B2 | 11/2010 | Willauer | |
| 8,198,349 | B2 | 6/2012 | Xiao et al. | |
| 8,618,238 | B2 | 12/2013 | Xie et al. | |
| 8,685,528 | B2 | 4/2014 | Xie et al. | |
| 9,117,568 | B2 | 8/2015 | Scheffer et al. | |
| 9,796,159 | B2 | 10/2017 | Kang et al. | |
| 10,601,142 | B2 * | 3/2020 | Henderson | H01Q 19/18 |
| 10,811,759 | B2 * | 10/2020 | Taylor | H01Q 1/288 |
| 11,267,224 | B2 | 3/2022 | Kang et al. | |
| 11,721,909 | B2 * | 8/2023 | Yi | H01Q 15/161 343/897 |
| 12,300,887 | B2 * | 5/2025 | Barrett | H01Q 1/288 |
| 2004/0017332 | A1 * | 1/2004 | Rao | H01Q 15/148 343/912 |
| 2004/0265755 | A1 | 12/2004 | Park et al. | |
| 2005/0154090 | A1 | 7/2005 | Salvino | |
| 2006/0142472 | A1 | 6/2006 | Hirai et al. | |
| 2008/0213490 | A1 | 9/2008 | Strange | |
| 2008/0262188 | A1 | 10/2008 | Xie et al. | |
| 2009/0130391 | A1 | 5/2009 | Taya | |
| 2009/0280330 | A1 | 11/2009 | Xie et al. | |
| 2010/0028686 | A1 | 2/2010 | Xie | |
| 2010/0125113 | A1 | 5/2010 | Xiao et al. | |
| 2010/0190011 | A1 | 7/2010 | Cheng et al. | |
| 2011/0086206 | A1 | 4/2011 | Scheffer et al. | |
| 2011/0088931 | A1 | 4/2011 | Lettow et al. | |
| 2024/0066828 | A1 | 2/2024 | Kang et al. | |

FOREIGN PATENT DOCUMENTS

| | | |
|---|---|---|
| JP | 5449779 | 3/2014 |
| KR | 1020040076512 | 3/2010 |
| WO | WO2003088818 | 10/2003 |
| WO | WO2007070877 | 6/2007 |

OTHER PUBLICATIONS

Craig L. Streett, et al., "Aerodynamic Noise Reduction for High-Lift Devices on a Swept Wing Model," 44th AAIA Aerospace Sciences Meeting and Exhibit, Jan. 9-12, 2006, pp. 1-26, Reno, Nevada.

Duerig et al., Designing With the Shape Memory Effect. MRS, vol. 9, pp. 581-597 1989.

Hilmar Koerner, et al., "Remotely Actuated Polymer Nanocomposites-Stress-Recovery of Carbon-Nanotube-Filled Thermoplastic Elastomers," Nature Materials, 2004, pp. 115-120, vol. 3.

Hissaaki Tobushi, et al., "Thermomechanical Properties in a Thin Film of Shape Memory Polymer of Polyurethane Series," Smart Mater. Struct., 1996, pp. 483-491, vol. 5, IOP Publishing Ltd., United Kingdom.

Jae Whan Cho, et al., "Electroactive Shape-Memory Polyurethane Composites Incorporating Carbon Nanotubes," Macromolecular Rapid Communications, 2005. pp. 412-416, vol. 26.

Kim et al., Graphene/Polymer Nanocomposites, Macromolecules 2010, 43, 6515-6530. Jul. 23, 2010. http://pubs.acs.org/doi/pdf/10.1021/ma100572e.

Momentive: RapidStrength RGS7700 Structural silicone elastomeric adhesive. Sep. 2008. http://www.siliconeforbuilding.com/pdf/glazing/Data-Sheet-RGS7700-RapidStrength-Structural.pdf.

PubChem: Bisphenol A diglycidyl ether. Retrieved on Feb. 4, 2015.

Richard Lin, Shape Memory Alloys and Their Applications (Lin), Feb. 22, 2008. http://web.stanford.edu/"richlin 1/sma/sma.html.

Takeru Ohki, et al., "Mechanical and Shape Memory Behavior of Composites with Shape Memory Polymer," Composites Part A: applied science and manufacturing, 2004, pp. 1065-1073, vol. 35.

Taro Imamura, et al., "Designing of Slat Cove Filler as a Noise Reduction Device for Leading-edge Slat," AIAA Paper 2007-3473, 2007, pp. 1-17.

Y. Liu, et al., "Thermomechanics of Shape Memory Polymer Nanocomposites," Mechanics of Materials, 2004, pp. 929-940, vol. 36.

Zhong et al., "Graphitic Carbon Nanofiber (GCNF)/Polymer Materials. II. GCNF/Epoxy Monoliths Using Reactive Oxydianiline Linker Molecules and the Effect of Nanofiber Reinforcement on Curing Conditions". Polymer Compositesvol. 26, Issue 2, Jan. 13, 2005.

Zhang, J.; Xu, S.; Li, W. High Shear Mixers: A Review of Typical Applications and Studies on Power Draw, Flow Pattern, Energy Dissipation and Transfer Properties. Chemical Engineering and Processing: Process Intensification 2012, 57-58, 25-41.

Ken Gall et al., Carbon Fiber Reinforced Shape Memory Polymer Composites, Journal of Intelligent Material Systems and Structures, vol. 11—Nov. 2000.

Yao Yao et al., Ultra-Thin, Ultra-Lightweight, and Multifunctional Skin for Highly Deformable Structures AIAA SciTech Forum Jan. 7-11, 2019, San Diego, California.

Yao Yao et al., Ultra-thin, Flexible Electronics for Measurements of Tape-Spring Hinge Behavior, AIAA SciTech Forum 11-15 & Jan. 19-21, 2021.

Andrei Zagrai et al., Structural Health Monitoring During Suborbital Space Flight, 66th International Astronautical Congress, Jerusalem, Israel. Copyright © 2015.

Suraj Rawal, Materials and Structures Technology insertion into Spacecraft Systems: Successes and Challenges, 68th International Astronautical Congress (IAC), Adelaide, Australia, Sep. 25-29, 2017.

Kang et al, A Study of Shape Memory Polymer Based Slat-Cove Filler, NASA/TM-2018-219804.

Juan M. Fernandez et al., Segmented Hexagonal Antenna Reflector Concentrically Stacked Using Shape Memory Composite Tubular Hinges, 41st ESA Antenna Workshop on Large Deployable Antennas, Sep. 25-28, 2023 at ESA-ESTEC in Noordwijk, The Netherlands.

M. Toral, G. Heckler, P. Pogorelo, N. George, K. Han, "Payload performance of third generation TDRS and future services," AIAA International Communications Satellite Systems Conference (ICSSC), 2017.

J. Footdale, J. Cody Griffe, M. E. Peterson, and C. Box, "Flexible composite shell design for the MARCO deployable reflector," AIAA Scitech 2019 Forum, Jan. 7-11, 2019, San Diego, CA.

P. N. Keller, M. S. Lake, D. Codell, R. Barrett, R. Taylor, M. R. Schultz., "Development of elastic memory composite stiffeners for a flexible precision reflector," 47th AIAA/ASME/ASCE/AHS Structures, Structural Dynamics, and Materials Conference, May 1-4, 2006, Newport, RD.

Jonathan Sauder, Starburst: A Concept for a New Deployable Structure Architecture, AIAA SciTech Forum Jan. 8-12, 2024, Orlando, FL.

Will Francis, Development of an EMC Self-Locking Linear Actuator for Deployable Optics, 45th AIAA/ASME/ASCE/AHS/ASC Structures, Structural Dynamics & Materials Conference Apr. 19-22, 2004, Palm Springs, California.

M. M. Mikulas Jr., P. R. Withnell, "Construction concepts for precision segmented reflectors," AIAA Paper 93-1461, 1993.

Juan M. Fernandez et al., Segmented, Pleat-Folded and Rib-Supported Thin-Shell Composite Antenna Reflector, 41st ESA

(56) References Cited

OTHER PUBLICATIONS

Antenna Workshop on Large Deployable Antennas, Sep. 25-28, 2023 at ESA-ESTEC in Noordwijk, The Netherlands.
M. M. Mikulas Jr., T. J. Collins, J. M. Hedgepeth, "Preliminary design approach for large high precision segmented reflectors," NASA Technical Memorandum 102605, 1990.
Y. She, S. Li, Z. Wang, "Constructing a large antenna reflector via spacecraft formation flying and reconfiguration control," AIAA Journal of Guidance, Control, and Dynamics, vol. 42, No. 6, Jun. 2019.
NASA, https://www.nasa.gov/press-release/nasa-funds-demonstration-of-assembly-and-manufacturing-in-space, published Jan. 31, 2020.
H. M. Y. C. Mallikarachchi, S. Pellegrino, "Optimized design of composite booms with integrated tape-spring hinges," AIAA 2010-2750.
D. S. Adams, M. Mobrem, "Lenticular jointed antenna deployment anomaly and resolution onboard the Mars Express spacecraft," AIAA Journal of Spacecraft and Rockets, vol. 46, No. 2, pp. 403-410, Mar.-Apr. 2009.
Lunark A Moon Habitat Analog, Saga Space Architects, Jul. 27, 2023 (retrieved from the internet: Jul. 27, 2023, p. 1-8.
Pehron, Nathan et al., "TRAC-Spring Guided Hinges," conference paper, AIA SCITECH 2022 Forum, Jan. 2022, pp. 1-21.
Melancon, David et al., "Multistable inflatable origami structrues at the metre scale," Nature, Apr. 22, 2021, pp. 540-550 and Supplementary pp. 1-31, vol. 592.
Leah Burrows, "Bistable Pop-Up Structures Inspired by Origami: Next Generation Inflatable Buildings Maintain Their Shape without constant Input of Pressure," Multimedia, Research, Apr. 21, 2021, pp. 1-5.

* cited by examiner

FIG. 6a
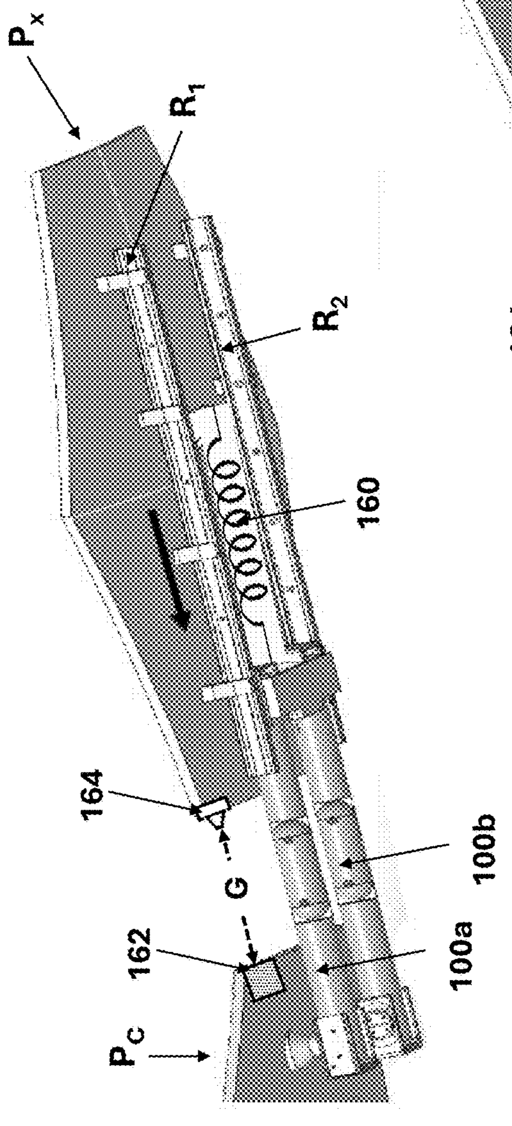
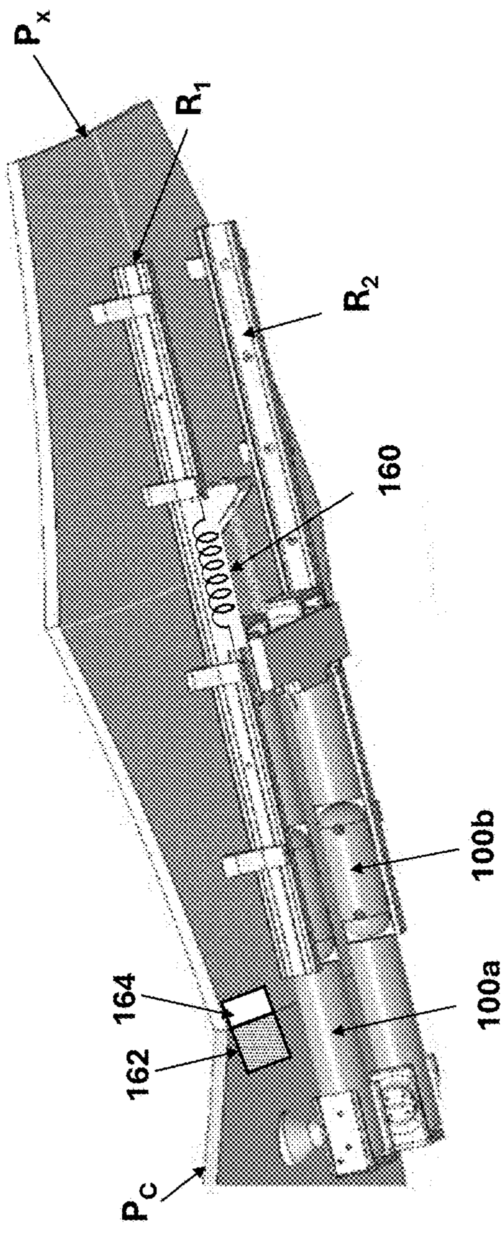
FIG. 6b

DEPLOYABLE ANTENNA REFLECTOR

CROSS-REFERENCE TO RELATED PATENT APPLICATION(S)

This patent application claims the benefit of and priority to U.S. Provisional Application No. 63/452,712, filed on Mar. 17, 2023 entitled Shape Memory Polymer Composite Substrate and priority to U.S. Provisional Application No. 63/452,713 filed on Mar. 17, 2023, the contents of which are hereby incorporated by reference in their entirety.

The patent application also cross-references commonly owned U.S. Pat. No. 9,796,159 entitled Electric Field Activated Shape Memory Polymer Composite; U.S. Pat. No. 11,267,224 entitled Method for Preparing and Electrically-Activated Shape Memory Polymer Composite; and U.S. patent application Ser. No. 18/238,137 entitled Composite Deployable Structure; U.S. Provisional Application No. 63/401,394, filed on Aug. 26, 2022; U.S. Provisional Application No. 63/452,752, filed on Mar. 17, 2023; U.S. Provisional Application No. 63/455,468, filed on Mar. 29, 2023; U.S. patent application Ser. No. 18/605,929 (LAR 20352-1) entitled Shape Memory Polymer Composite Substrate, and U.S. patent application Ser. No. 18/606,292 (LAR 20513-1) entitled Deployable Antenna Reflectors Array Formed of Multiple Connected Gores, each of which is incorporated herein by reference in its entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE EMBODIMENTS

Antennas are the cornerstone of high data rate communications and transmission for Earth missions and deep-space communications, both from space and from moon/planetary surfaces. Deploying operational antennas into space in an efficient manner remains a challenge. In order to meet the increasing demand for high-throughput satellited (HTS) antennas that can operate at higher frequencies, larger reflector configurations are required.

Conventional, fixed, solid surface antenna radiofrequency (RF) reflectors up to 4 meters in diameter are available and can target Ka-Band or above RF transmission. Deployable versions with rigid panels up to 10 meters in diameter have been explored, but present mechanical complexities to stow/deploy due to volume and mass.

Deformable versions using thin-shell composite reflective surface construction, such as that described in U.S. Pat. No. 6,344,835, are possible but have size limitations, e.g., less than 10 m diameter, due to surface accuracy requiring deep backbones or perimeter ring structures to scale up. Mesh reflector antennas are currently the only technical approach to realize effectively deployable reflectors larger than 10 meters for Ka-Band RF transmission but have limitations for higher RF bands due to faceting inherent to the mesh architecture and not having a solid surface. The RF energy at higher frequencies would leak through the gaps in the mesh. It is understood that frequencies above 60-70 GHz require a solid, highly accurate surface.

For even larger reflector needs greater than 10-20 meters, in-space assembly (ISA) is a considered approach. Current concepts like the Space Infrastructure Dexterous Robot (SPIDER) rely on robotic arm to assemble many individual panels that do not package well, and require complicated techniques for joining and multiple operations, increasing cost and risk. The discontinued SPIDER experiment by Maxar on NASA's On-orbit Servicing, Assembly and Manufacturing (OSAM-1) mission was planned to robotically assemble a 3-m scale reflector from seven 1-m rigid segments fixed to the spacecraft, but the rigid elements do not package efficiently inside the rocket fairing and must be assembled by a large robotic arm using overly complicated techniques.

There remains a need for improved materials, configurations and processes for efficient self-deployment of antenna reflectors of varying sizes in space to support S-band and above RF (≥2 GHZ).

BRIEF SUMMARY OF THE EMBODIMENTS

In a first exemplary embodiment, an antenna reflector array having at least a stowed position and a deployed position includes: multiple panels and a central panel, each of the multiple and central panels including a functional side and a non-functional side, wherein in the stowed position, the multiple hexagonal and central panels are in a compact configuration; multiple sets of heat actuated flexible hinges formed of a shape memory composite ("SMC") substrate, each of the multiple sets of flexible hinges being connected at a first end thereof to a non-functional side of one of the multiple panels and at a second end thereof to the non-functional side of the central panel, the heat actuated flexible hinges being controllable between a first shape and a second shape; and further wherein, when each set of heat actuated flexible hinges changes from the first shape to the second shape, a panel connected thereto is moved from a first position to a second position.

In a second exemplary embodiment, an antenna reflector array having at least a stowed position and a deployed position includes: multiple panels and a central panel, each of the multiple and central panels including a functional side and a non-functional side, wherein in the stowed position, the multiple hexagonal and central panels are in a concentrically stacked configuration; multiple sets of heat actuated flexible hinges, each of the multiple sets of flexible hinges being connected at a first end thereof to a non-functional side of one of the multiple panels and at a second end thereof to the non-functional side of the central panel, the heat actuated flexible hinges being controllable between a first shape and a second shape, and further wherein, when each set of heat actuated flexible hinges changes from the first shape to the second shape, a panel connected thereto is moved from a first position to a second position; and multiple closing mechanisms, each of the multiple closing mechanisms being movably attached to a set of heat actuated flexible hinges and an associated one of the multiple panels, wherein each of the multiple closing mechanisms is triggered when its associated panel is in the second position, the multiple closing mechanisms moving its associated panel to a third position responsive to the trigger, the third position resulting in the final deployed position.

In a third exemplary embodiment, a process for assembling multiple individual reflector sub-arrays into a consolidated reflector array includes: deploying multiple individual reflector sub-arrays from their stowed positions, each of the multiple individual reflector sub-arrays including multiple connected panels and a connecting boom for maintaining connection with a spacecraft, wherein deploying an individual reflector sub-array includes activating one or more hinges connected between each side panel and a central panel of the subarray on the non-functional surfaces thereof to deploy each of the side panels from their stowed positions; robotically connecting each of the multiple deployed individual sub-arrays to a designated central deployed individual sub-array, wherein the boom of each of the multiple deployed individual sub-arrays is robotically attached to a different connection point on the central deployed individual sub-array; and further wherein at least one additional securing mechanism is robotically attached between at least one panel of each of the multiple deployed individual sub-arrays and a panel of the designated central deployed individual sub-array These and other features, advantages, and objects of the present embodiments will be further understood and appreciated by those skilled in the art by reference to the following specification, claims, and appended drawings.

BRIEF DESCRIPTION OF THE SEVERAL VIEWS OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

FIGS. 6*a*, 6*b*, 6*c*, 6*d*, 6*e*, 6*f*, 6*g*, 6*h* and 6*i* illustrate various views and features of the underside of a reflector array during deployment in accordance with one or more embodiments herein;

DETAILED DESCRIPTION

It is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
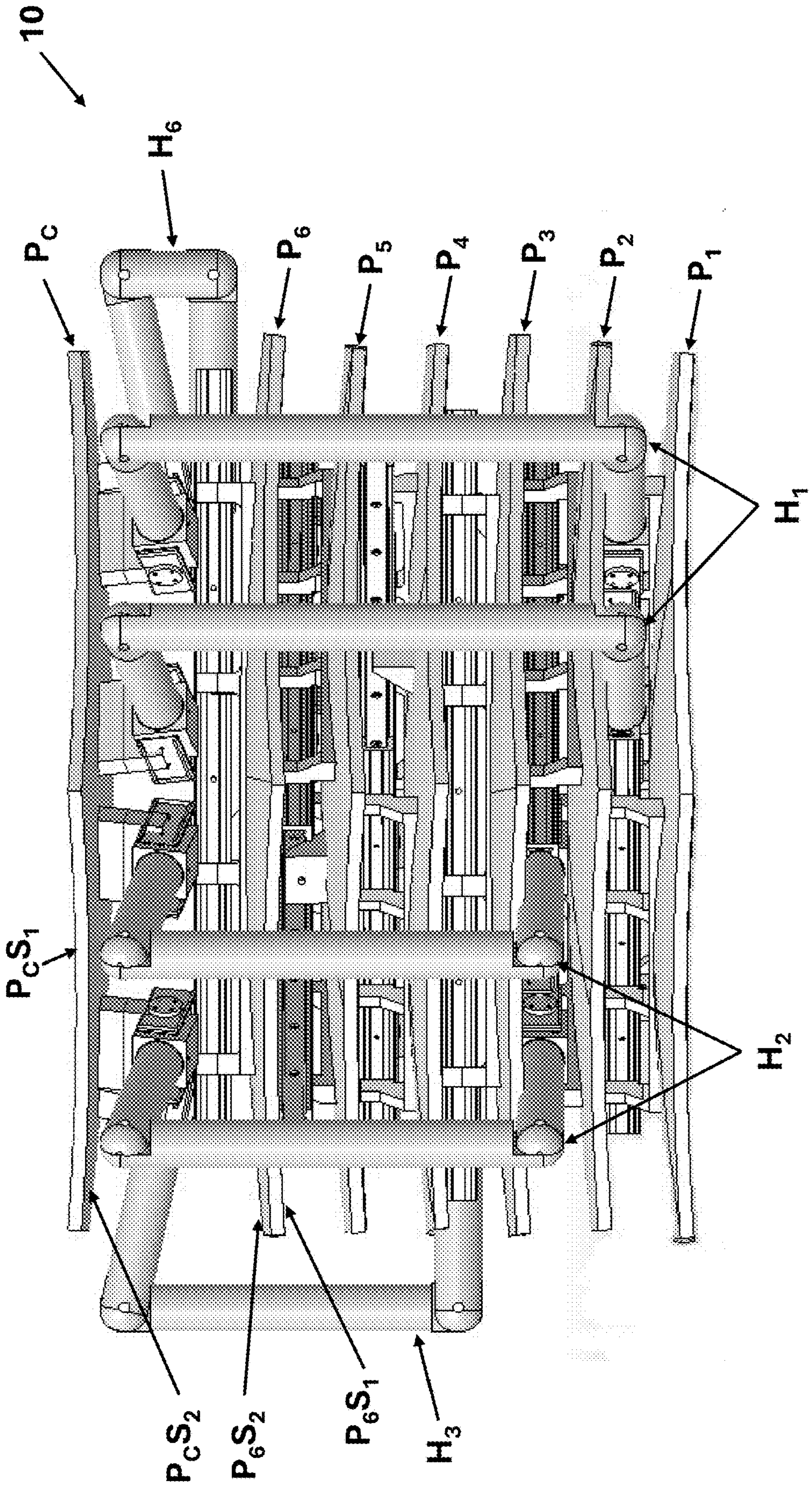
FIG. 1 illustrates a first stacked configuration of a seven-panel reflector array in accordance with one or more embodiments herein.

FIG. 1 presents a first configuration of a seven-panel reflector array 10 in a stowed, concentrically stacked configuration. Rigid hexagonal panels one through six, $P_1$, $P_2$, $P_3$, $P_4$, $P_5$, $P_6$, are attached to the central panel $P_C$, by individual sets of two composite tubular hinges $H_1$, $H_2$, $H_3$, $H_4$ (not shown), $H_5$ (not shown), $H_6$. Panels $P_1$, $P_2$, $P_3$, $P_4$, $P_5$, $P_6$ are constructed using a sandwich approach to yield a high specific stiffness construction. By way of example, the panel core can be made from carbon foam (CFOAM 30®) sealed with ES-215 epoxy resin mixed with IHG hardener that is used in high temperature composite tooling or a carbon fiber reinforced plastic (CFRP) honeycomb sheet, both of which provide a low coefficient of thermal expansion (CTE) material. CFRP face sheets can be co-cured directly onto the cores and bonded in a single step using a thin EA9696 epoxy film or similar adhesive. The face sheet is a four-ply balanced and symmetric plain weave laminate. Additional details may be found in the conference manuscript to Juan M. Fernandez et al., SEGMENTED HEXAGONAL ANTENNA REFLECTOR CONCENTRICALLY STACKED USING SHAPE MEMORY COMPOSITE TUBULAR HINGES, 41$^{st}$ ESA Antenna Workshop on Large Deployable Antennas, 25-28 Sep. 2023 at ESA-ESTEC in Noordwijk, The Netherlands, the contents of which is incorporated herein by reference in its entirety.

Figure 8B:
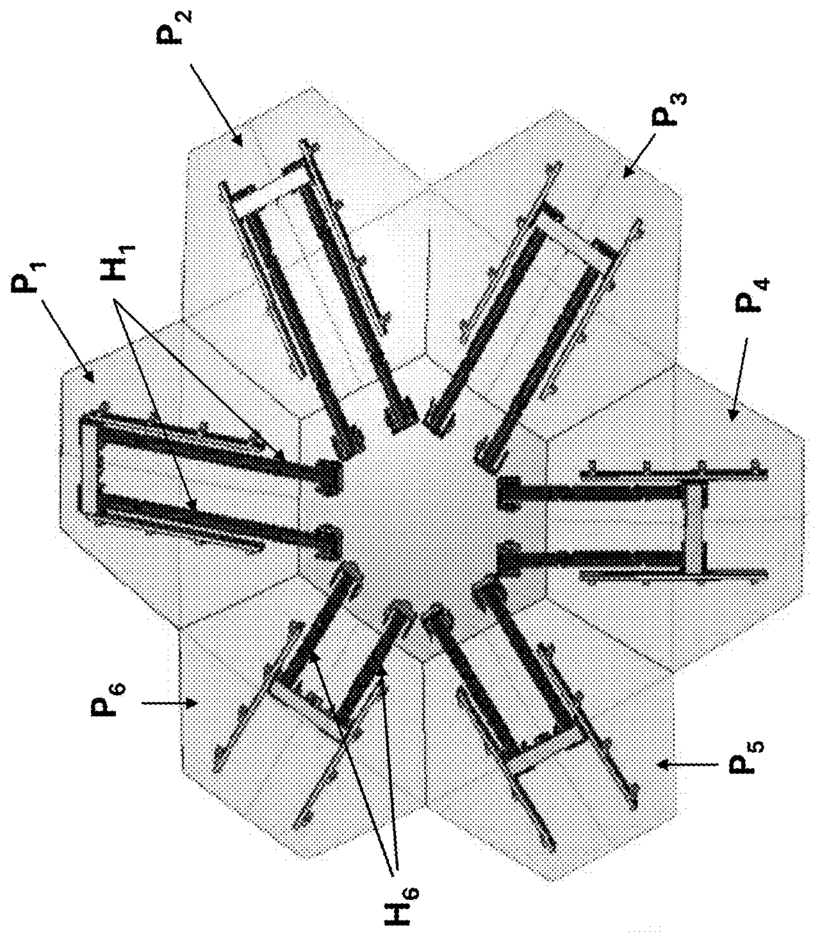
FIGS. 8*a* and 8*b* show top view (FIG. 8*a*) of fully deployed reflector array and bottom view (FIG. 8*b*) of fully deployed reflector array in accordance with one or more embodiments herein.
Figure 8A:
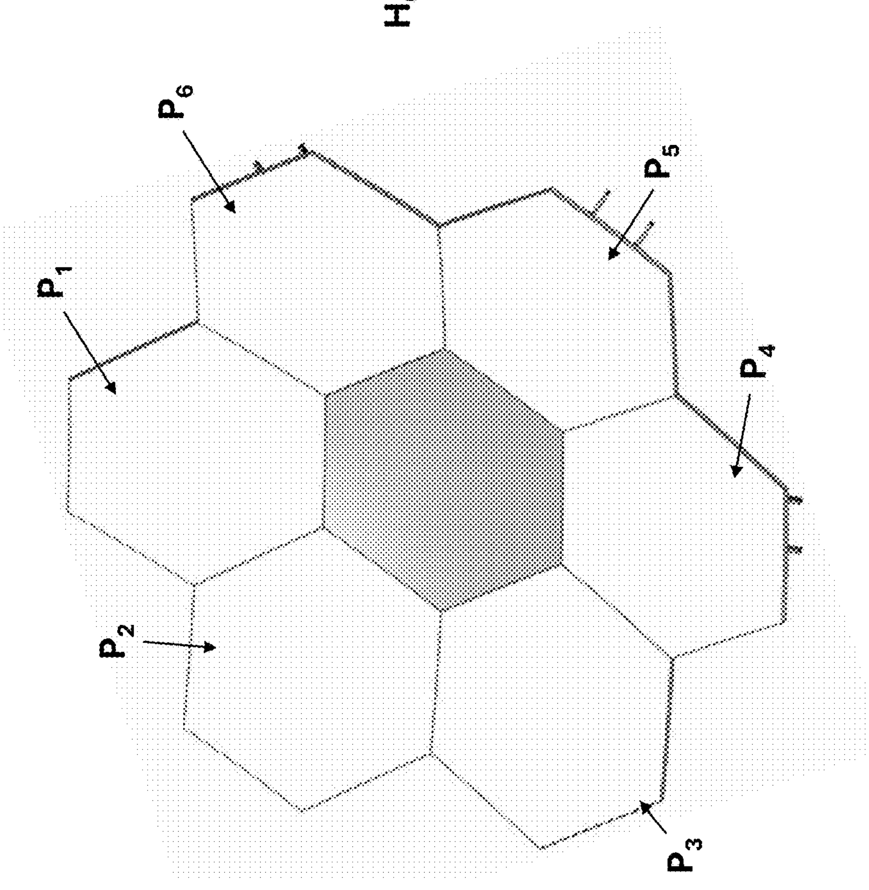

In the embodiment shown in FIG. 1, all panels are double curved. Further to the configuration of FIG. 1, when in the stowed or stacked position, the central panel $P_C$'s concave, reflective side $P_CS_1$ faces away—or opposite—from the functional, reflective sides, e.g., $P_6S_1$, of panels one through six. The non-functional, non-reflective sides of central panel $P_C$, $P_CS_2$ and $P_6$, $P_6S_2$ face each other. While the illustrated panel shape is hexagonal, other panels shapes are possible, such as squares or pentagons. In the deployed position, all concave, functional, reflective sides of $P_C$, $P_1$, $P_2$, $P_3$, $P_4$, $P_5$, $P_6$ face the same direction to create a parabolic reflector (see FIG. 8*a*). In alternatives embodiments, all panels may be doubly curved to form any desired surface of revolution (spherical, paraboloid, etc.) in the deployed state, single curved to form a cylindrical surface in the deployed state, or flat to form a flat surface in the deployed state. Hinges $H_1$, $H_2$, $H_3$, $H_4$, $H_5$, and $H_6$ are attached to the non-functional, non-reflective sides of panels $P_C$, $P_1$, $P_2$, $P_3$, $P_4$, $P_5$, $P_6$.

Figure 2A:
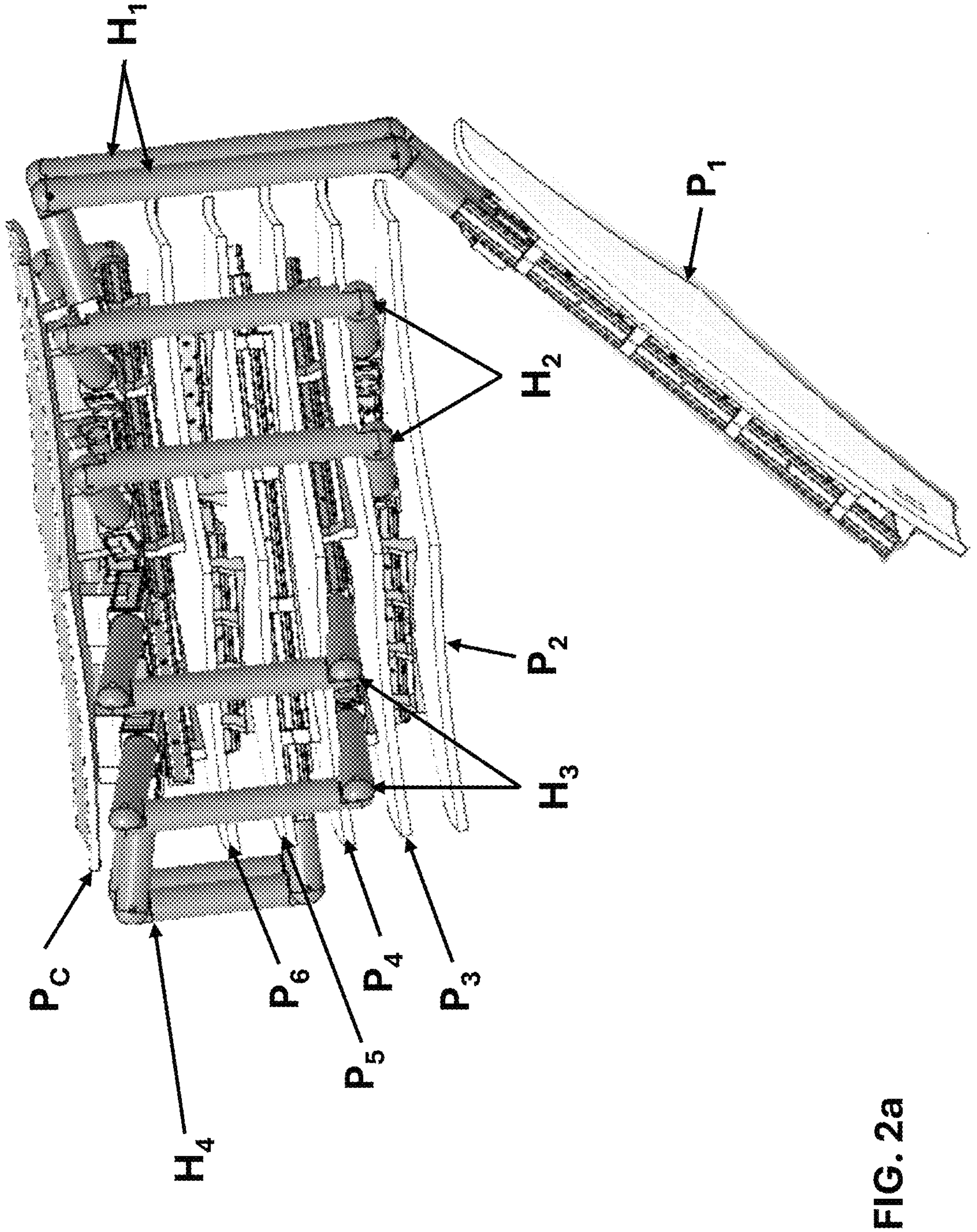
FIGS. 2*a* and 2*b* illustrate the stacked array of FIG. 1 in various stages of deployment in accordance with one or more embodiments herein.
Figure 2B:
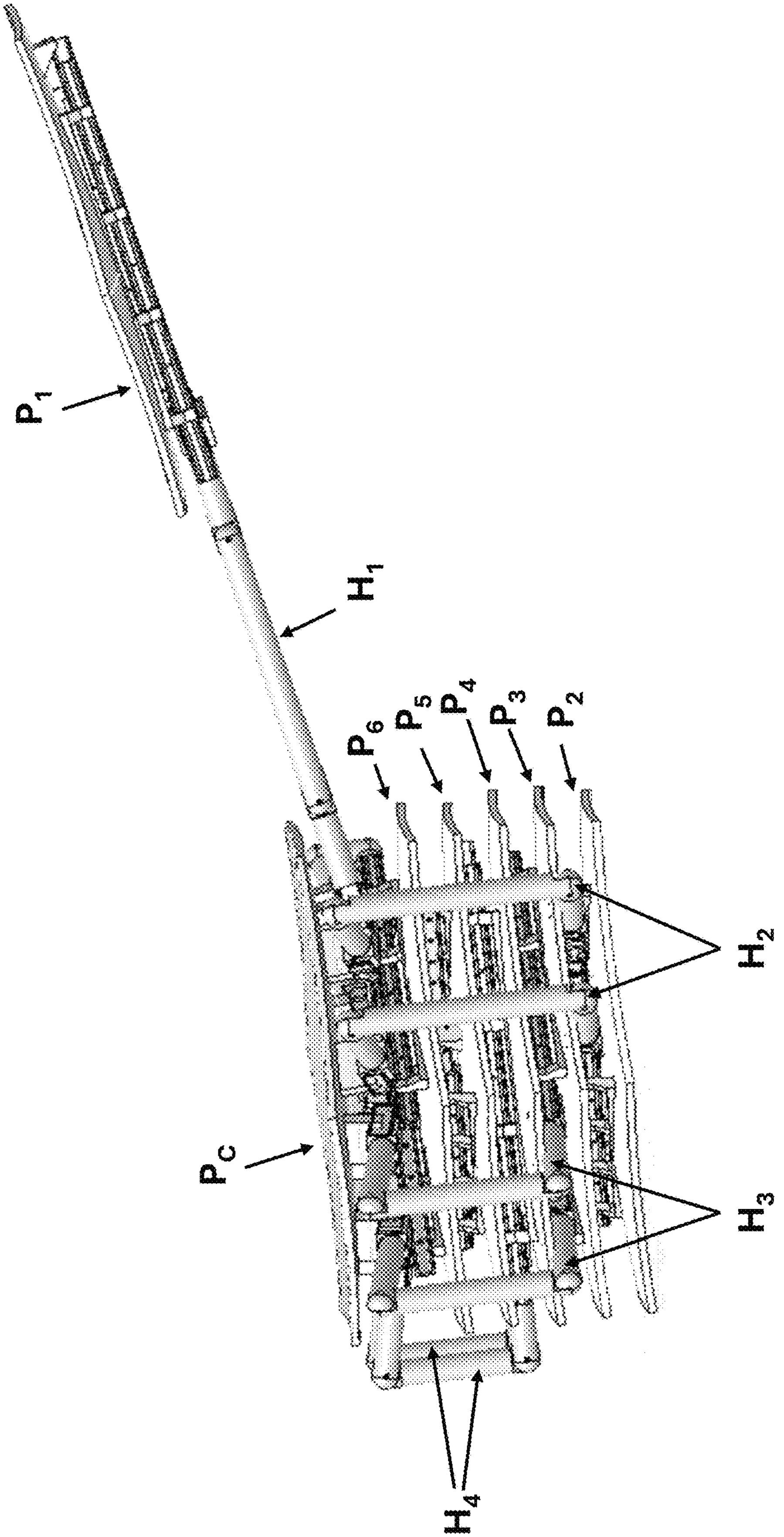

FIGS. 2*a* and 2*b* present array 10 in different stages of the reflector deployment process. Specifically, FIG. 2*a* shows the first panel $P_1$ at a first interim point of deployment, wherein the two composite hinges in set $H_1$ mid-process of straightening. And FIG. 2*b* shows the first panel $P_1$ at a second interim point of deployment, wherein the two composite hinges in set $H_1$ are straight.

Composite hinges $H_1$, $H_2$, $H_3$, $H_4$, $H_5$, and $H_6$ are formed from a flexible shape memory composite ("SMC") substrate such as that described in co-owned U.S. patent application Ser. No. 18/605,929 and U.S. Provisional Patent Application No. 63/452,712 which are incorporated herein by reference in their entireties. Components formed from SMC can be programmed into a temporary shape through applied force and internal heating. In the programmed shape, the deformed structure is in a frozen state remaining dormant without external constraints. Upon heating once more, the substrate will return slowly (several to tens of seconds) to the original shape.

Figure 3B:
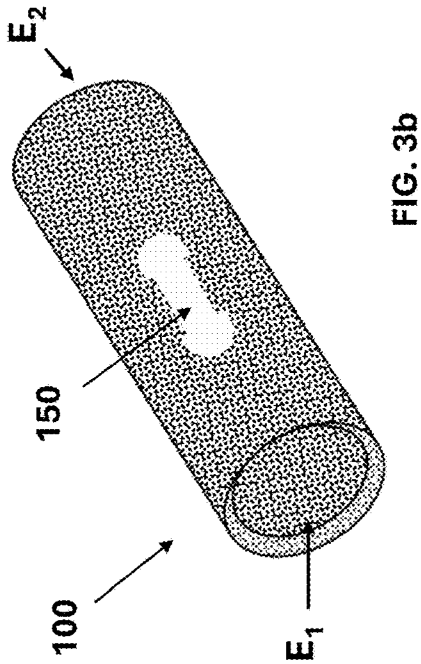
FIGS. 3*a*, 3*b*, 3*c* and 3*d* illustrate a first exemplary hinge formed from flexible shape memory composite (SMC) in heat/electrically and/or mechanically controlled stages of shape changes in accordance with one or more embodiments herein.
Figure 3D:
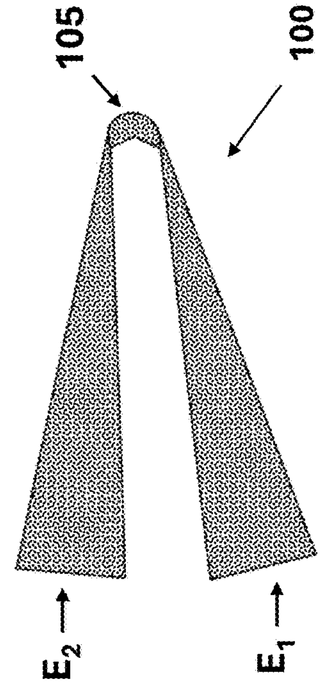
Figure 3A:
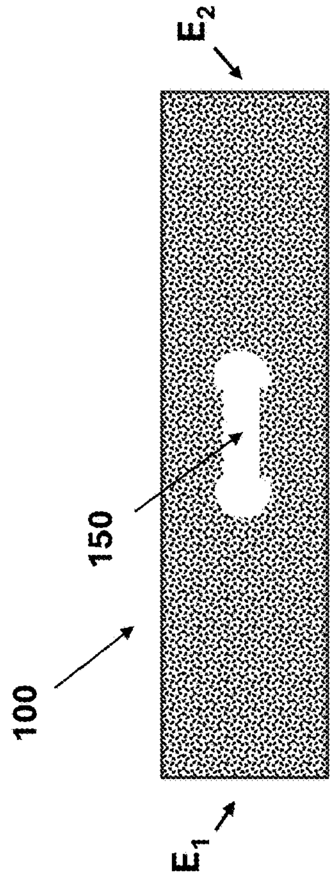
Figure 3C:
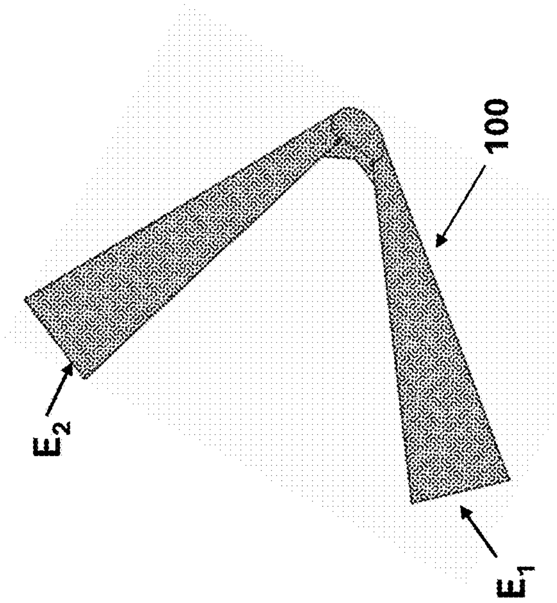

Referring to FIGS. 3*a*, 3*b*, 3*c* and 3*d*, a first exemplary hinge 100 formed from SMC is originally in the tubular shape shown in FIGS. 3*a*, 3*b* and has been programmed into the temporary, frozen shape shown in FIG. 3*d*. Upon heat (actuating) being applied to one or more heaters (not shown) embedded within or on the surface of the hinge 100 while in its pre-programmed frozen shape (FIG. 3*d*), hinge 100 unfolds, passing through intermediate shapes (e.g., FIG. 3*c*) to its original shape (FIG. 3*a*, 3*b*). Hinge 100 is in a tube configuration, with a cutout portion 150 on diametrically opposing sides of the tube. Hinge 100 includes first and second ends $E_1$ and $E_2$.

Figure 4A:
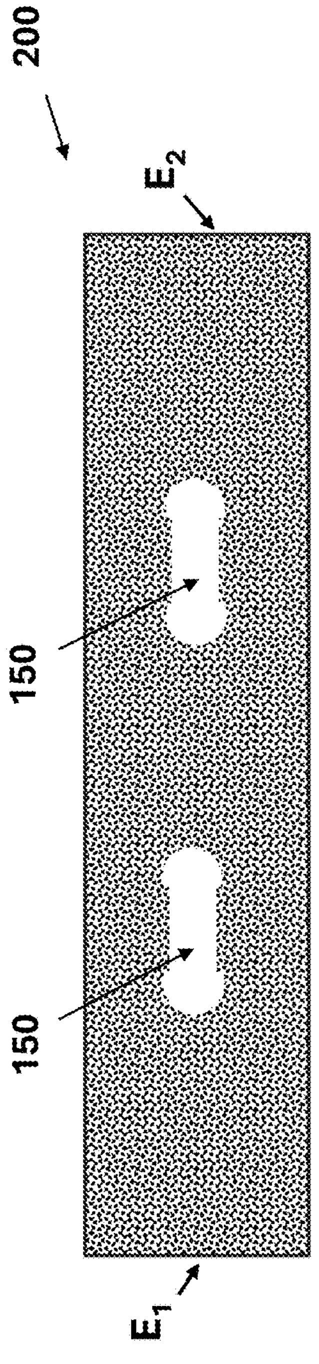
FIGS. 4*a*, 4*b*, 4*c* illustrate a second exemplary hinge formed from flexible shape memory composite (SMC) in heat/electrically and/or mechanically controlled stages of shape changes in accordance with one or more embodiments herein.
Figure 4C:
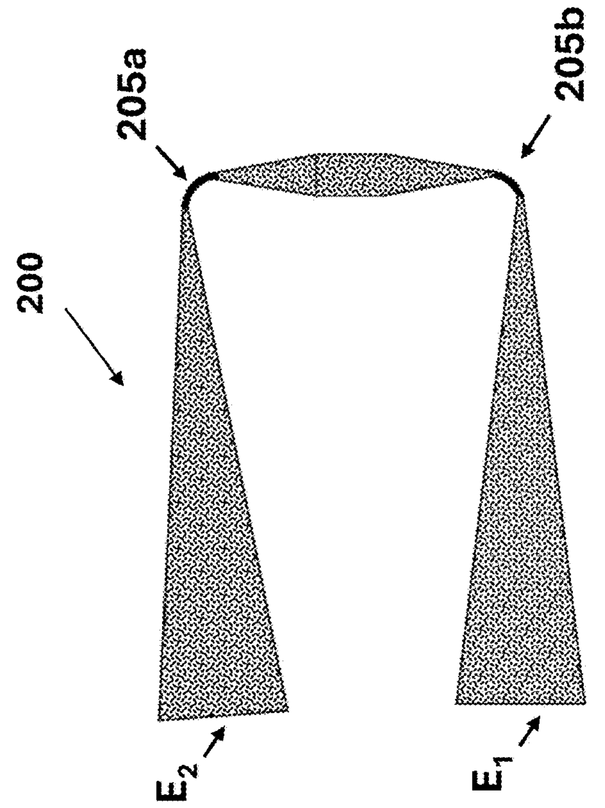
Figure 4B:
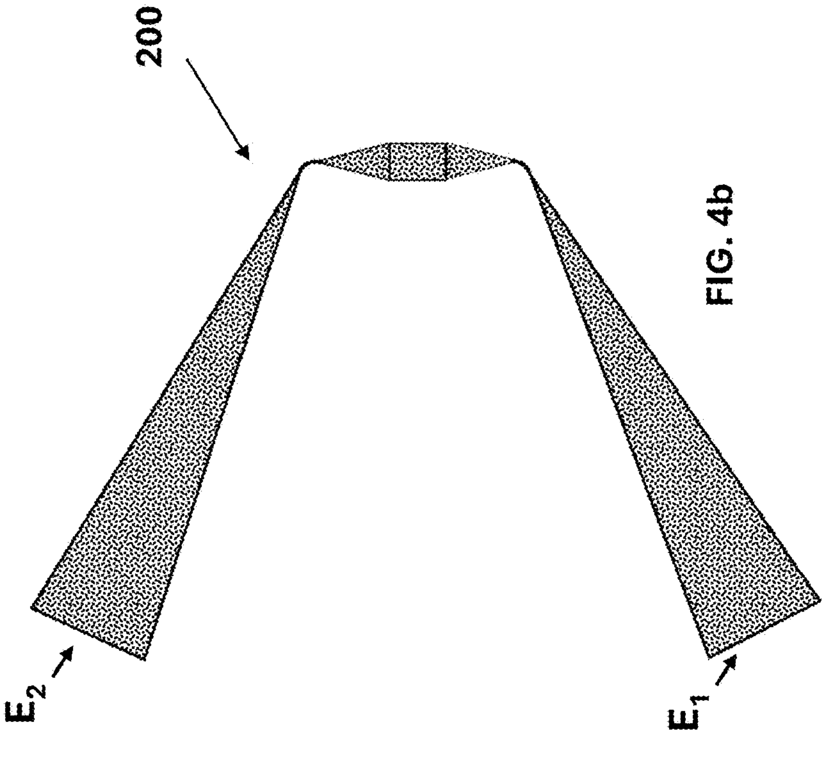

Similar to the first exemplary hinge 100, a second exemplary hinge 200 (FIGS. 4*a*, 4*b*, 4*c*) is identical to hinge 100 in all respects except hinge 200 includes two cutout portions 150, two on each diametrically opposite side, which facilitate two hinging points 205*a* and 205*b* during actuation (as compared to single hinge point 105 in hinge 100). The cutouts of exemplary hinges 100 and 200 are diametrically opposite dog bone-shapes that enable localized pinching and folding the hinge without damage. Dog bone slots are preferred over straight slots with a constant slot width to increase deployed stiffness and minimize the risk of hinge snap back and deployment anomaly. Other optimal cutout shapes are possible depending on the hinge design.

As described in co-owned U.S. patent application Ser. No. 18/605,929 SMC hinges used in the present embodiments may also include on or more layers of heat spreading material to assist with distribution of applied heat, as well as sensors, such as strain and temperature sensors and a microprocessor for implementing a monitoring and feedback process.

Figures 5A, 5B, 5C:
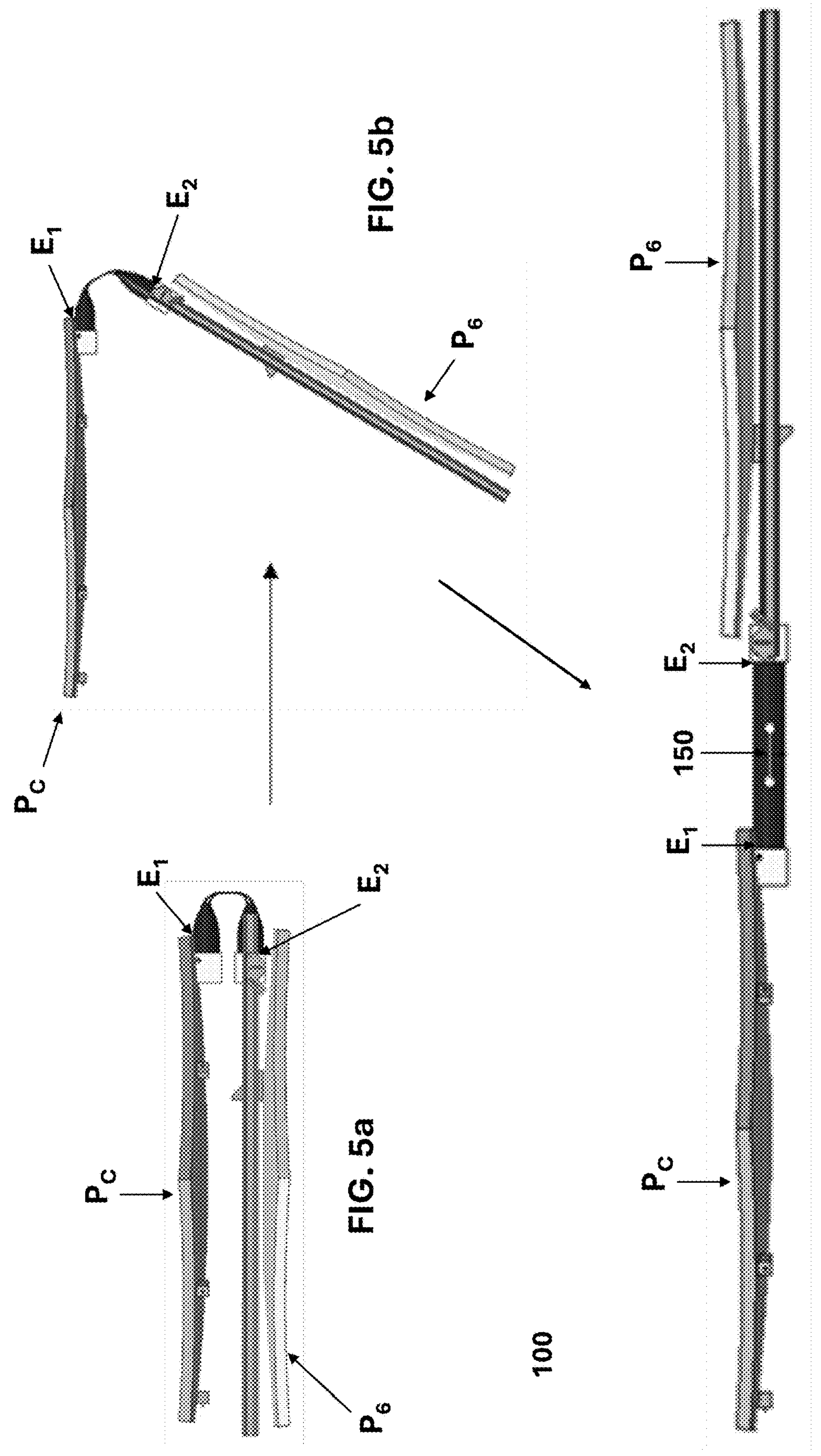
FIGS. 5*a*, 5*b*, 5*c* illustrate an exemplary two-panel configuration with flexible hinge in accordance with one or more embodiments herein.

As illustrated in FIGS. 5*a*, 5*b* and 5*c*, at least a first hinge 100 may be used to secure panel $P_6$ to the central panel $P_C$. Panel $P_6$ is stowed when the hinge is in its programmed temporary shape (FIG. 5*a*) and opens when the hinge is heat actuated through its one or more heaters, passing through various intermediate shapes (FIG. 5*b*) until panel $P_6$ is fully unfolded when hinge 100 is at its original shape (FIG. 5*c*). For all other panels, $P_1$, $P_2$, $P_3$, $P_4$, $P_5$, hinge 200 is used as these panels are farther from the central panel $P_c$ and the dual hinge points 205*a*, 205*b* are needed to complete the approximately 180-degree unfolding.

In a preferred embodiment, each panel $P_x$ is connected to the central panel $P_C$ by two parallel hinges, 100*a* and 100*b* as shown in FIGS. 6*a* and 6*b*. FIG. 6*a* is an isometric view of the underside of FIG. 5*c* and shows additional features of the reflector array. More particularly, FIG. 6*a* shows guide rails $R_1$ and $R_2$ and spring 160 which facilitate closing the remaining gap G between panels $P_x$ and $P_C$ once hinge 100 has finished unfolding. FIG. 6*b* shows the panels with no gap therebetween. Also shown are cup 162 and cone 164 mating elements which further align and secure the panels together. While only one set of mating elements are shown in the FIGS., a second set is located on the opposite side of the hinges. Additional alignment feature pairs can be used. FIGS. 6*f*, 6*g*, 6*h* and 6*i* provide various views and features of the exemplary mating elements 162 and cone 164. In FIGS. 6*h* and 6*i*, cone 164 includes protruding cone portion 165 which includes press fit portions 166 located at approximately 120, 240 and 360 degree locations on cone portion 165. At the end of each press fit portion 166 is a clip protrusion 167 for clicking into place within a female receiver portion 168 in cup 162.

Figure 6C:
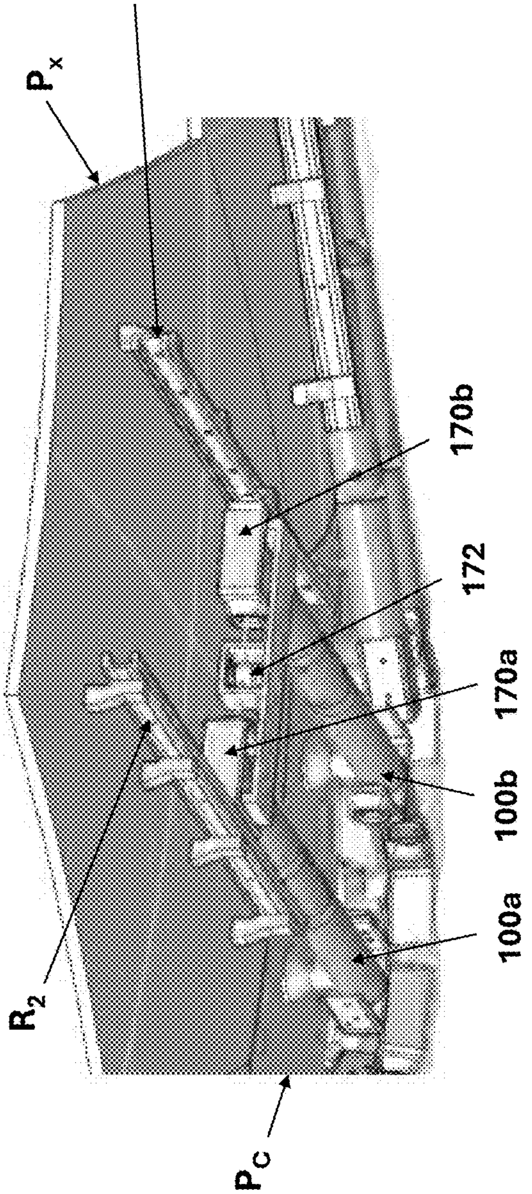
Figure 6E:
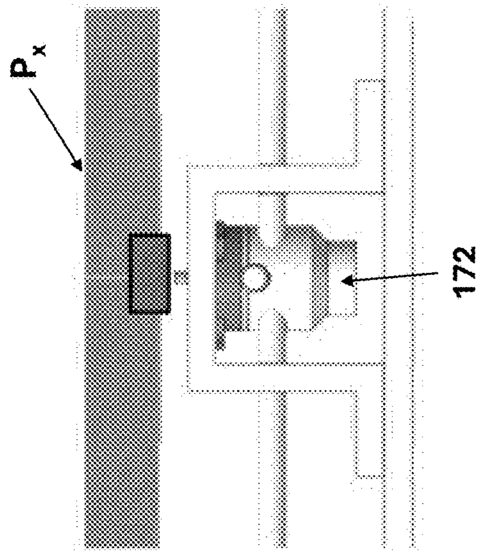
Figure 6D:
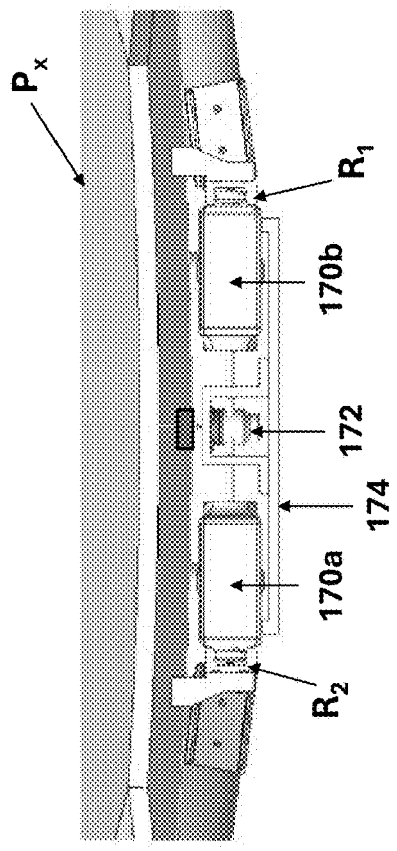
Figure 6H:
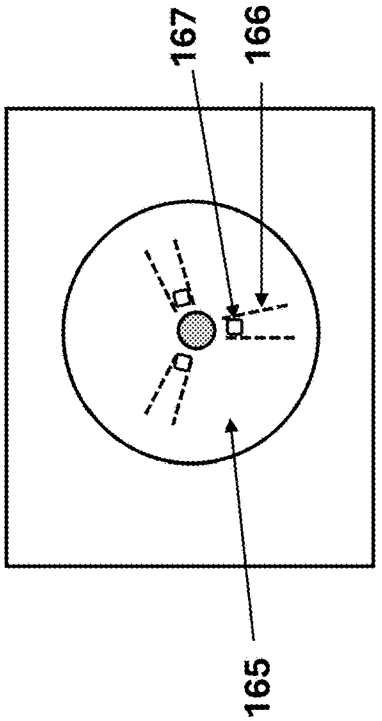
Figure 6I:
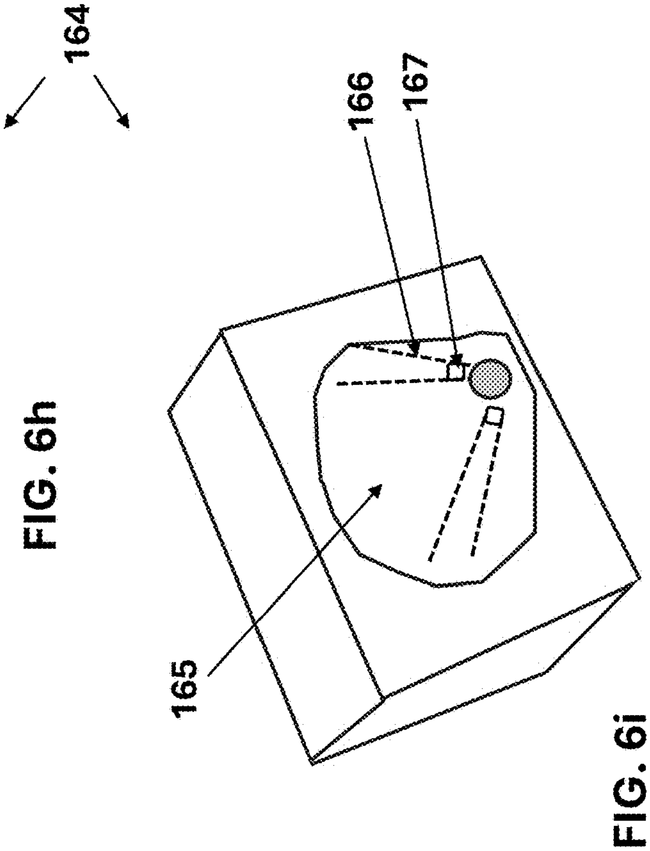
Figure 6F:
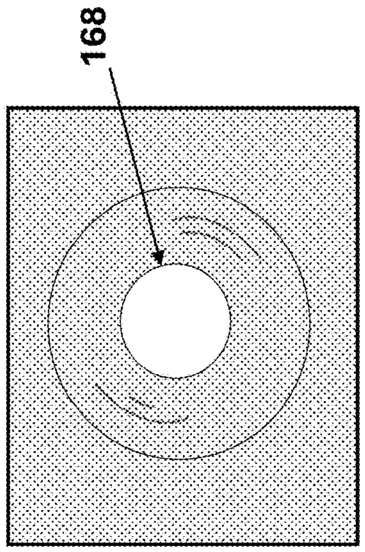
Figure 6G:
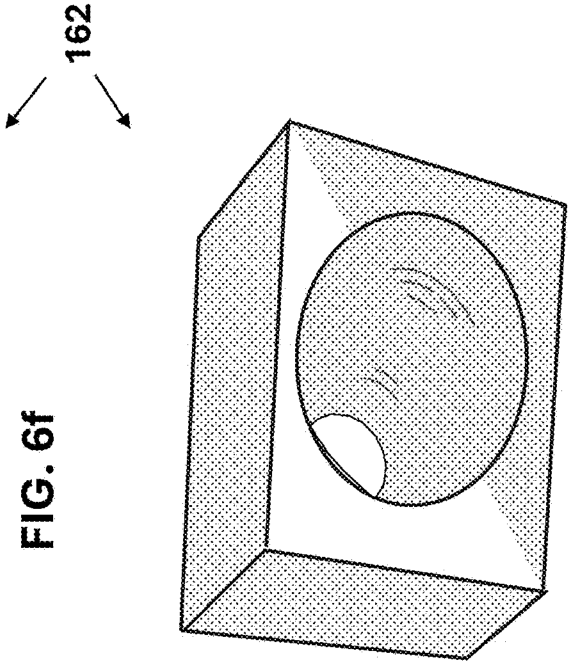

FIGS. 6*c*, 6*d* and 6*e* provide additional views of the guide rails $R_1$ and $R_2$ and the hold-down release mechanism 172 located on each panel $P_x$. Mechanism 172 fixes hinge end fittings 170*a*, 170*b* to the panel $P_x$ when held down. When released, spring 160 is triggered and the spring force (constant force spring or tension spring) act approximately along the tubular hinge axis when the hinges are deployed to close the gap G by translating the hinge end fittings 170*a*, 170*b* fixed to trolley 174 along the guide rails $R_1$ and $R_2$. The hold-down release mechanism 172 can take the form of, for example, a Frangibolt or a pin puller.

Figure 7:
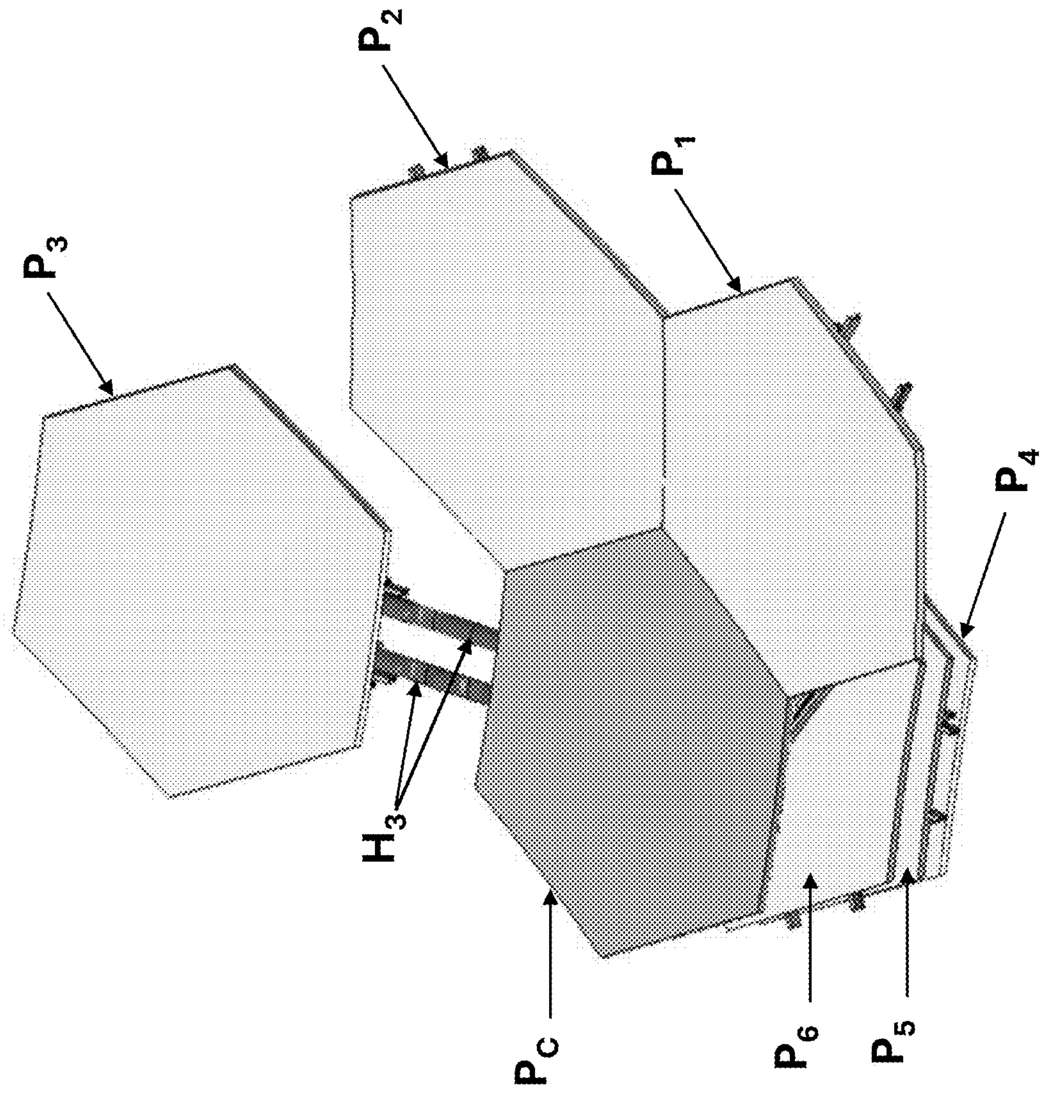
FIG. 7 provides an isometric view of a reflector array midway through deployment in accordance with one or more embodiments herein.

FIG. 7 provides a top view of the reflector array midway through deployment. As shown, panels $P_1$ and $P_2$ are deployed and in place, panel $P_3$ is partially deployed and panels $P_4$, $P_5$ and $P_2$ are awaiting deployment, in order.

Figure 9A:
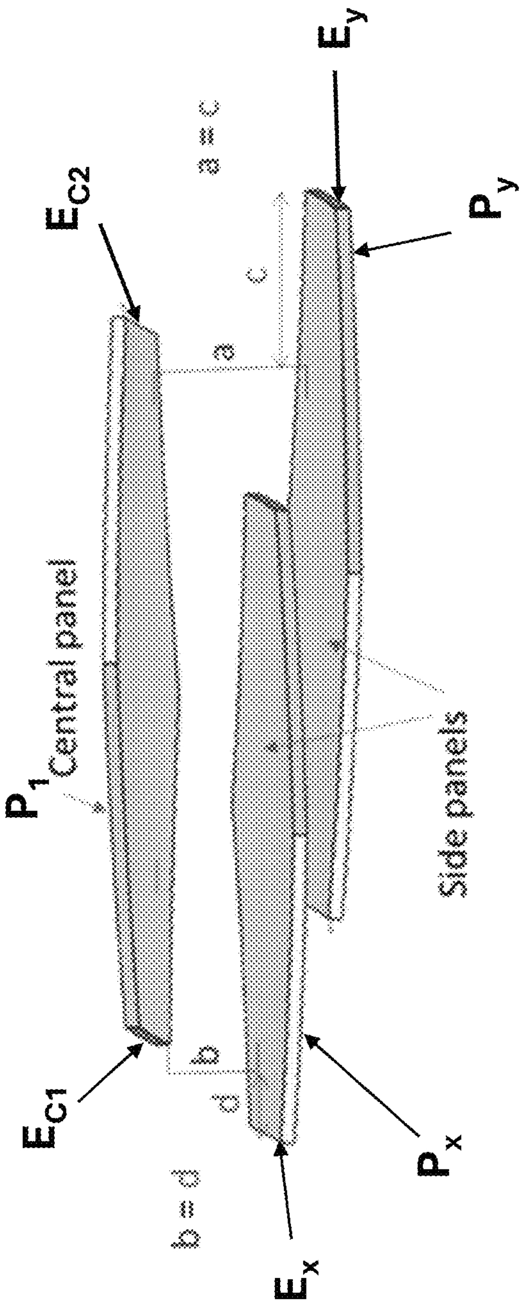
FIGS. 9*a*, 9*b*, 9*c*, 9*d*, 9*e*, 9*f*, 9*g*, 9*h*, 9*i*, 9*j*, 9*k* illustrate a second stacked configuration of a seven-panel reflector array in accordance with one or more embodiments herein.
Figure 9C:
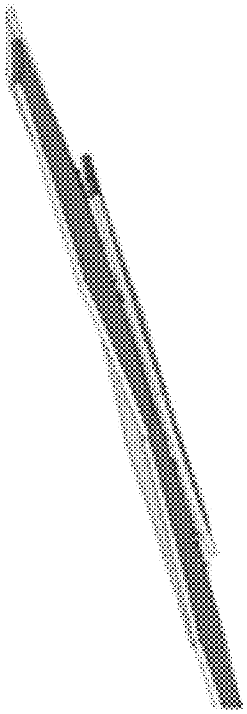
Figure 9E:
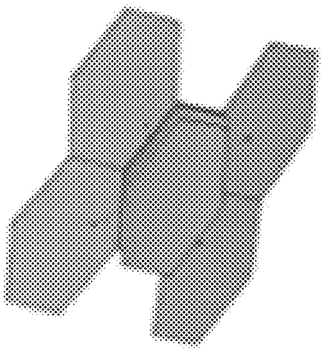
Figure 9B:
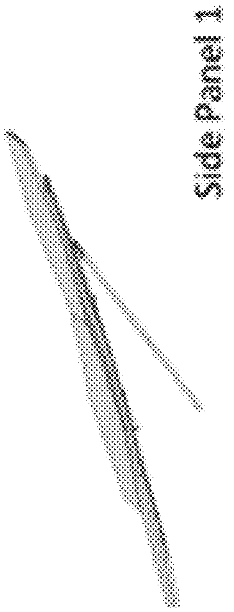
Figure 9D:
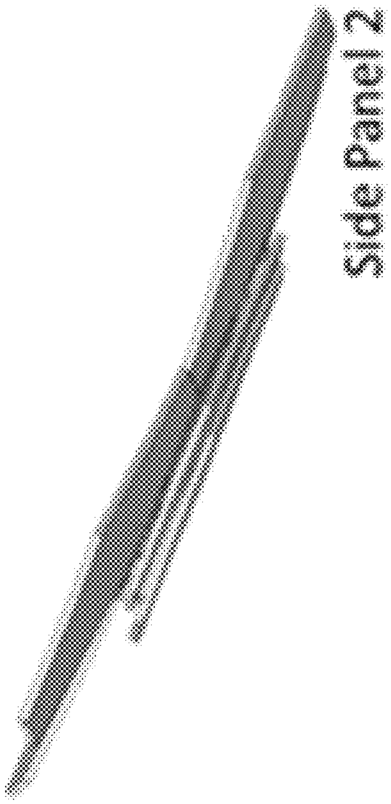
Figure 9F:
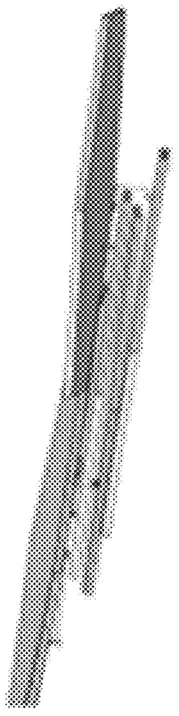
Figure 9G:
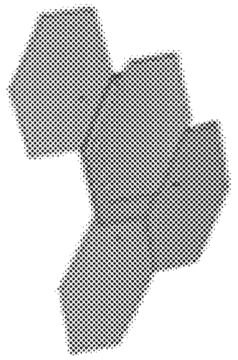
Figure 9H:
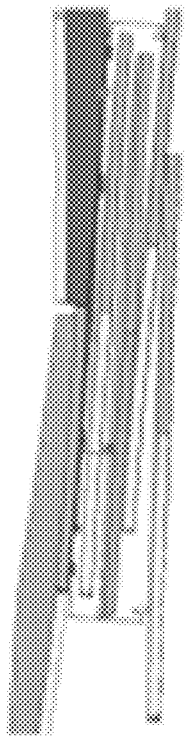
Figure 9I:
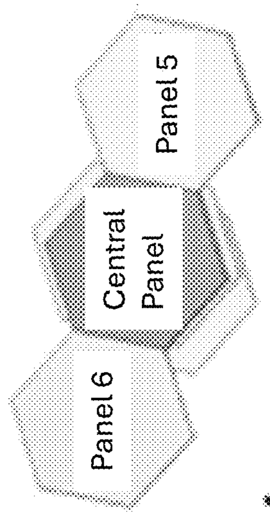
Figure 9J:
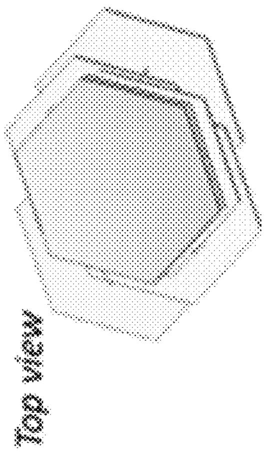
Figure 9K:
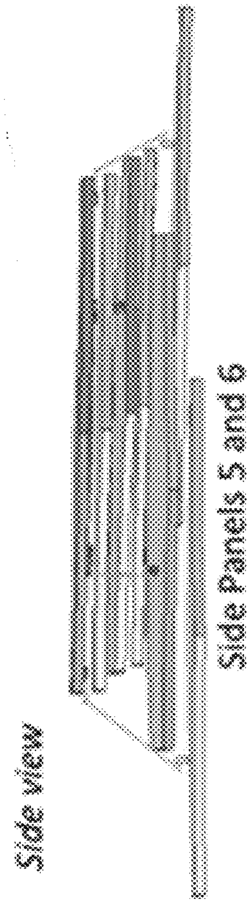

FIGS. 9*a* and 9*b* show top view (FIG. 9*a*) of fully deployed reflector array and bottom view (FIG. 9*b*) of fully deployed reflector array. In FIG. 9*b*, note the different lengths of the pairs of hinges. The panel $P_1$, which is furthest from the central panel $P_C$ in the stowed stack (see FIG. 1), has the longest hinges $H_1$, with hinges decreasing in size moving up the stowed stack to shortest hinges $H_6$ on $P_6$. When deployed the hinges form a backbone support structure on the non-functional, non-reflective side that provides out-of-plane stiffness to the reflector assembly. Without the hinges, the seam line(s) of the assembly would behave like a hinge in itself.

FIGS. 9*a*, 9*b*, 9*c*, 9*d*, 9*e*, 9*f*, 9*g*, 9*h*, 9*i*, 9*j*, 9*k* illustrate a second stacked configuration of a seven-panel reflector array wherein the panels are stacked in a offset or staggered configuration such that each panel directly aligns with the central panel and neighboring panels when its respective hinges are unfolded. The lateral offset between each panel in the stowed state is designed such that when the pairs of tubular SMC hinges actuate they already mate the pairs of panel edges and there is no need for a secondary mechanism to close a gap between the central and neighboring panels and the newly unfolded panel as is required in the first concentrically stacked configuration describe above with respect to FIG. 1 et seq. Accordingly, while the concentric case provides an axisymmetric stacked configuration that is more volumetrically efficient, it is a heavier and more complex configuration than the offset approach of FIG. 9*a* et seq. due to the need for the use of the secondary closing mechanisms. In order to achieve direct alignment of each side panel with the central panel during deployment, the offset distance $D_o$ must equal the vertical panel to panel distance $D_v$ for each panel. By way of example, FIG. 9*a* shows central panel $P_C$ and two side panels $P_x$ and $P_y$. The closest panel $P_x$, has offset distance $D_o$=d and vertical panel to panel distance $D_v$=b. In order for direct mating between the edge $E_x$ of panel $P_x$ and the edge $E_{C1}$ of central panel $P_C$ to occur when deployed, the following must be true b=d. Similarly, for panel $P_y$, which has offset distance $D_o$=c and vertical panel to panel distance $D_v$=a. In order for direct mating between the edge $E_y$ of panel $P_y$ and the edge $E_{C2}$ of central panel $P_C$ to occur when deployed, the following must be true a=c.

FIGS. 9*b* to 9*k* provide various views of a panel stowage sequence for a deployed offset reflector stack.

Figure 10A:
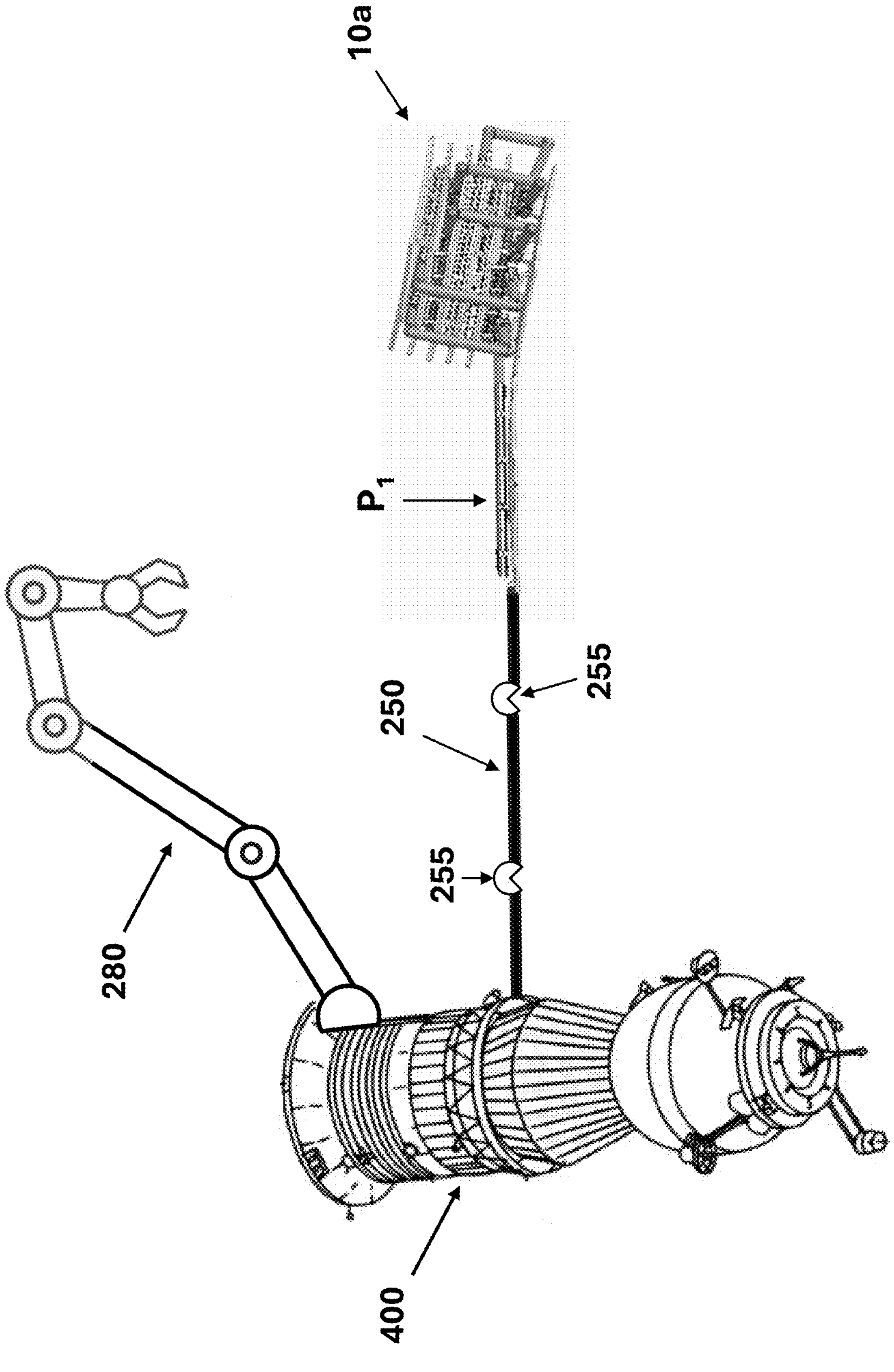
FIGS. 10*a*, 10*b*, 10*c* and 10*d* illustrate and in-space assembly process for constructing a larger reflector from multiple deployed reflector sub-arrays in accordance with one or more embodiments herein.
Figure 10B:
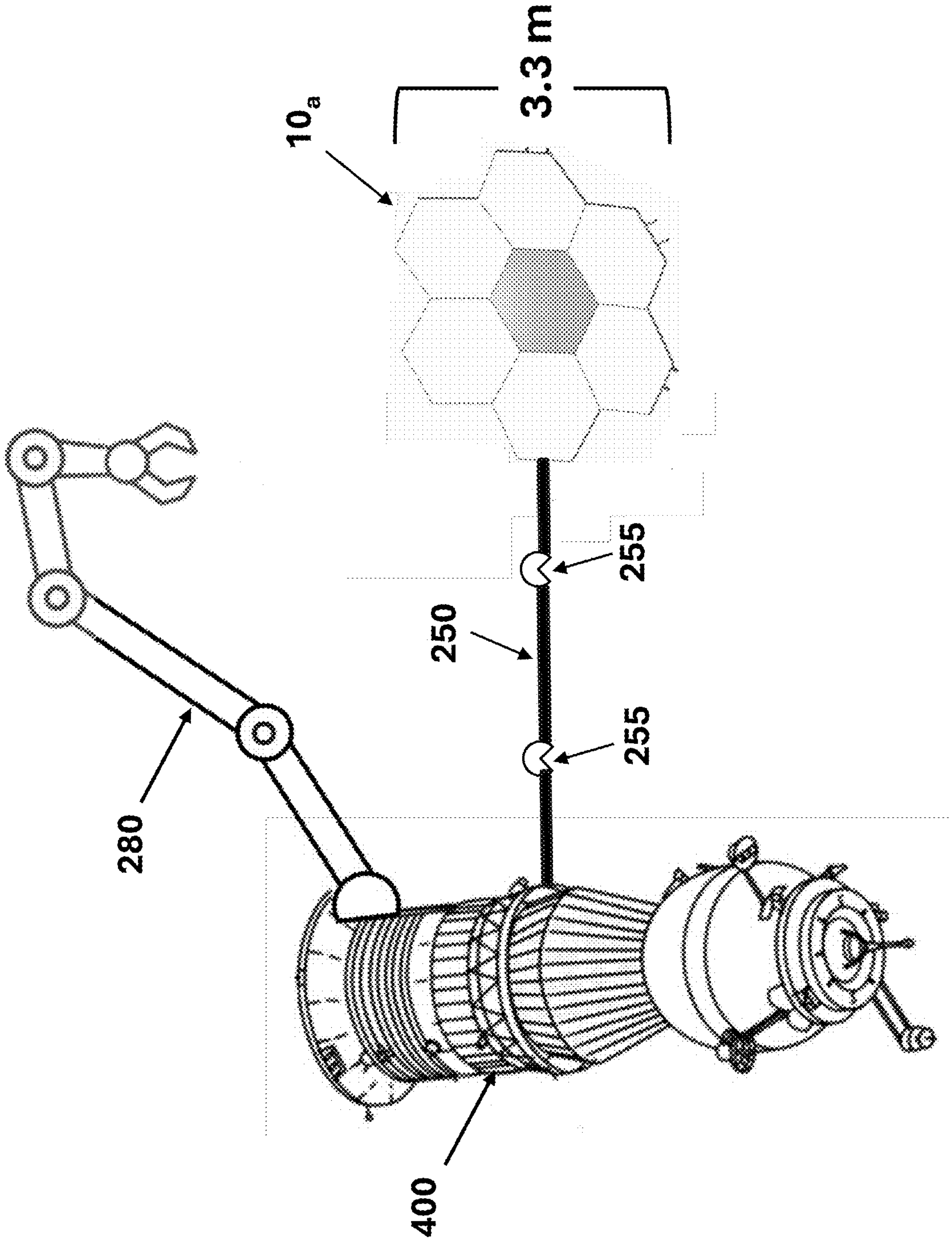

FIGS. 10*a*, 10*b*, 10*c* and 10*d* illustrate how the reflectors described above are central to a scalable architecture design which uses a combination of deployable and robotic-arm in-space assembly to construct a larger reflector. Referring to FIG. 10*a*, the outermost side panel, e.g., $P_1$ from stacked configurations above (furthest from the central one) will connect to the main spacecraft boom 250 having hinges 255, which is anchored from the spacecraft 400. As this side panel deploys first, the stacked reflector sub-array $\mathbf{10}_a$ will be displaced from the spacecraft and the rest of the side panels will deploy one at a time triggered by activate hinges, e.g., the thermally actuated SMC hinges described above, resulting in a fully deployed reflector sub-array $\mathbf{10}_a$ as shown in FIG. 10*b*.

Figure 10C:
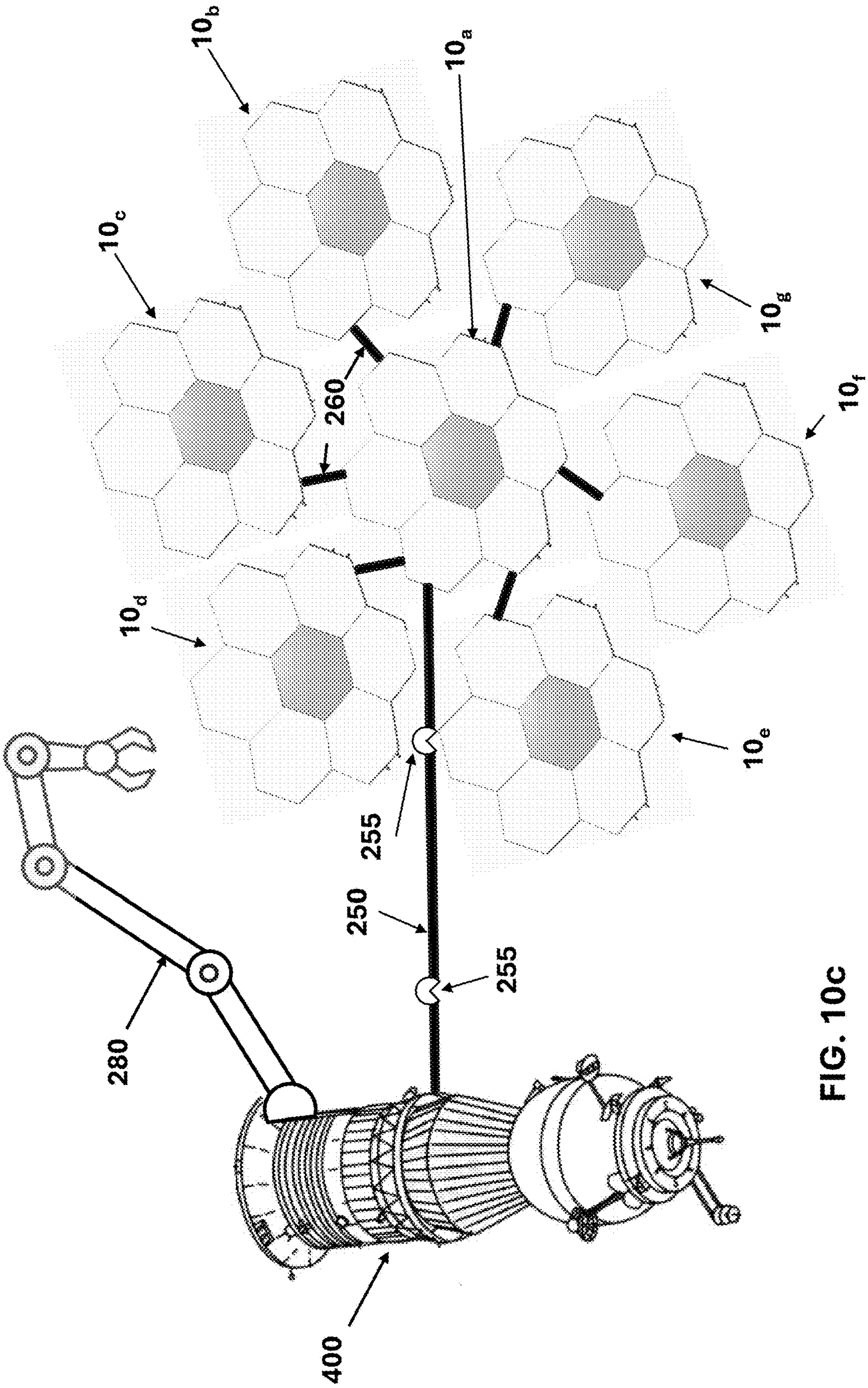
Figure 10D:
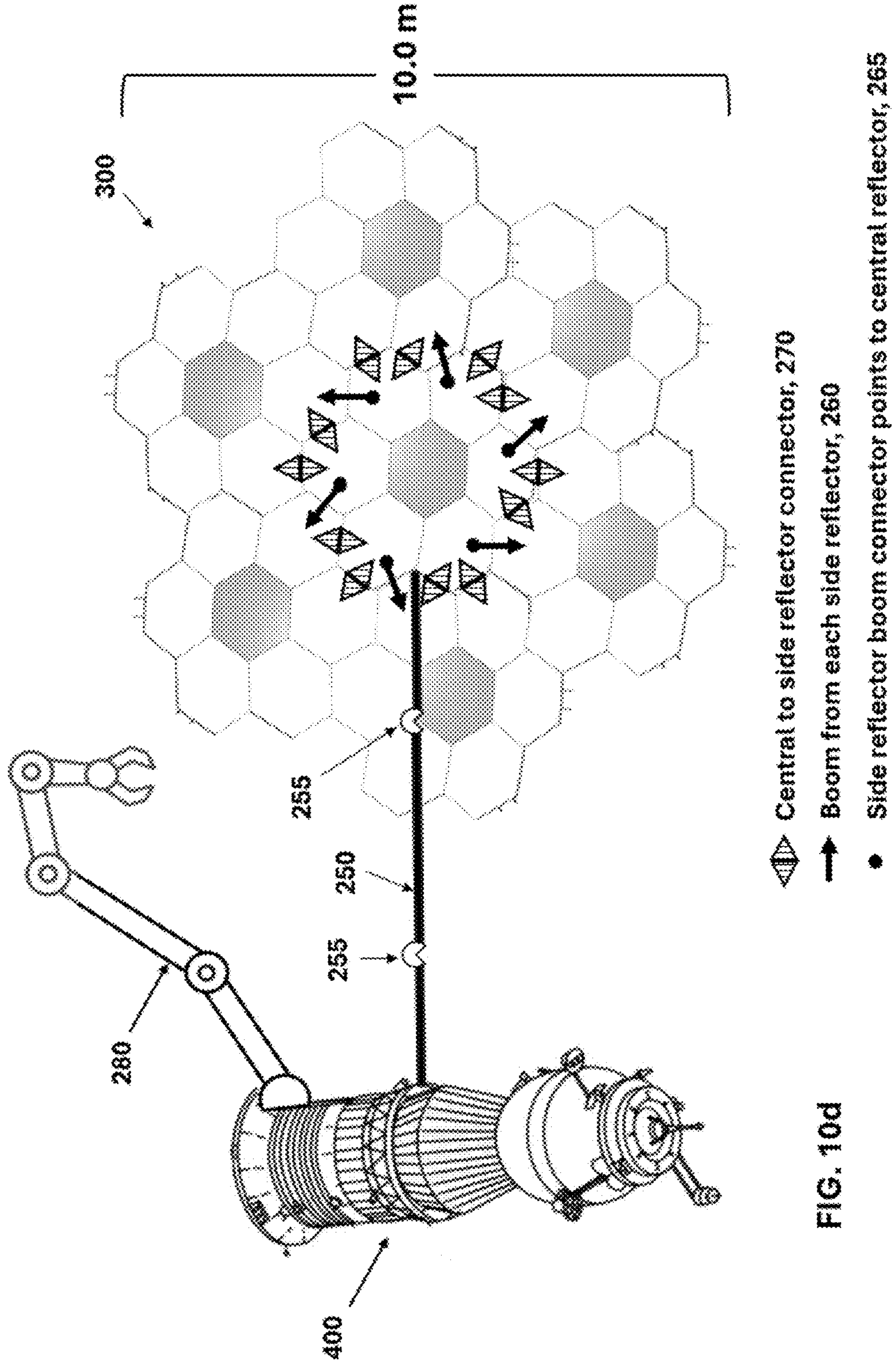

In FIG. 10*c*, this first deployed sub-reflector $\mathbf{10}_a$ can become the central reflector sub-array in a larger reflector by connecting to additional deployed reflector sub-arrays $\mathbf{10}_b$, $\mathbf{10}_c$, $\mathbf{10}_a$, $\mathbf{10}_e$, $\mathbf{10}_f$, and $\mathbf{10}_g$ via their individual booms 260 to contact points 265 on the central reflector sub-array $\mathbf{10}_a$ and other robotically connected assembly plates 270 as shown in FIG. 10*d*. Robotic arm 280 may be used to facilitate connections and placing of assembly plates described herein.

Referring to FIG. 10*d*, the final larger reflector 300 is the series of high-precision reflector sub-arrays $\mathbf{10}_b$, $\mathbf{10}_c$, $\mathbf{10}_d$, $\mathbf{10}_e$, $\mathbf{10}_f$, and $\mathbf{10}_g$, each cantilevered from a small offset boom 260 that a robotic arm attached to the spacecraft 400 uses to place and fix to the main central deployable reflector sub-array $\mathbf{10}_a$ already supported from the main spacecraft boom 250, as shown in FIG. 10*a*. To increase the number of load paths through each reflector sub-array and increase global deployed stiffness, rigid interconnect assembly plates 270 can be used. This architecture does not require a robotic arm much longer than the size of the central reflector sub-array in order to keep cost down as the system scales up since the robotic arm is one of the main cost drivers. Robotic arm 280 is not shown to scale.

Figure 11C:
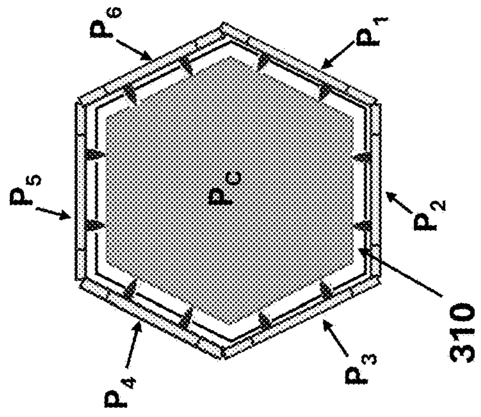
FIGS. 11*a*, 11*b*, and 11*c* illustrate alternative configurations to the panel stacking configuration of FIG. 1.
Figure 11B:
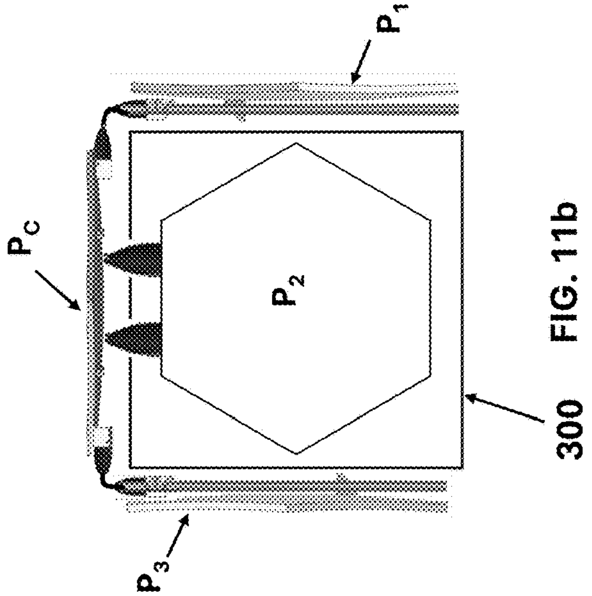
Figure 11A:
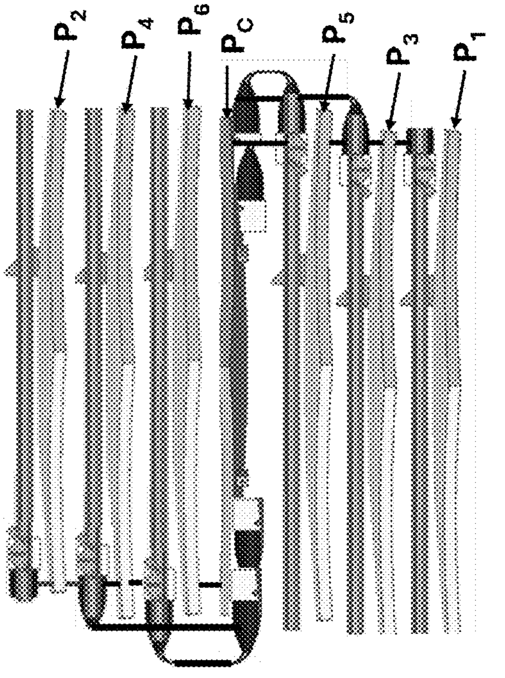

One skilled in the art will recognize that panel stacking configurations described above are not limited to the configurations shown. For example, FIGS. 11*a*, 11*b* and 11*c* illustrate alternative configurations to the panel stacking configuration of FIG. 1. In FIG. 11*a*, panels are stacked below ($P_1$, $P_3$, $P_5$) and above ($P_2$, $P_4$, $P_6$) the central panel $P_C$. In this configuration, some panels may be deployed at the same time, e.g., $P_1$ and $P_2$, $P_3$ and $P_4$, and $P_5$ and $P_6$. It will be appreciated that the number of panels below and above need not be the same. In FIG. 11*b*, panels $P_1$, $P_2$, $P_3$, $P_4$ (not shown) need not be stacked vertically, but could be stowed around the natural sides of a cube-type satellite 300. In this configuration, hinges $H_1$, $H_2$, $H_3$, $H_4$ (not shown), need only deploy 90 degrees (versus the 180 degrees in the stacked configurations). In FIG. 11*c*, which is showing a top view facing central panel $P_C$, panels $P_1$ thru $P_6$, are stowed around the natural sides of an hexagonal-type satellite 310. In this configuration hinges $H_1$ thru $H_6$ need only deploy 90 degrees.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the features of the embodiments and does not pose a limitation on the scope of the embodiments unless otherwise claimed. No language in the specification should be construed as indicating any non-claimed element as essential to the practice of the embodiments.

Preferred embodiments are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, these embodiments includes all modifications and equivalents of the subject matter recited in the claims appended hereto as permitted by applicable law. Moreover, any combination of the above-described elements in all possible variations thereof is encompassed by the embodiments unless otherwise indicated herein or otherwise clearly contradicted by context.

What is claimed is:

1. An antenna reflector array having at least a stowed position and a deployed position, the array comprising:

multiple panels and a central panel, each of the multiple and central panels including a functional side and a non-functional side, wherein in the stowed position, the multiple and central panels are in a compact configuration;

at least one heat actuated flexible hinge formed of a shape memory composite ("SMC") substrate, each of the at least one flexible hinge being connected at a first end thereof to a non-functional side of one of the multiple panels and at a second end thereof to the non-functional side of the central panel, the at least one heat actuated flexible hinge being controllable between a first shape and a second shape; and further wherein, when each of the at least one heat actuated flexible hinge changes from the first shape to the second shape, the multiple panels connected thereto are moved from a first position to a second position.

2. The antenna reflector array of claim 1, wherein each of the at least one flexible hinge includes a controllable heater for providing heat to a heat actuated flexible hinge to actuate the heat actuated flexible hinge between the first and second shapes.

3. The antenna reflector array of claim 1, wherein each of the heat actuated flexible hinges is tubular.

4. The antenna reflector array of claim 1, wherein each of the multiple panels and the central panel are a rigid construction.

5. The antenna reflector array of claim 1, wherein at least one of the heat actuated flexible hinges includes a hinge having a single hinge point and remaining the of heat actuated flexible hinges include hinges having dual hinge points.

6. The antenna reflector array of claim 1, wherein the compact configuration is a stacked configuration, wherein the functional side of the central panel faces away from the non-functional sides of the multiple panels.

7. The antenna reflector array of claim 6, wherein the functional side of each of the multiple and central panels is curved; and wherein when in the stacked configuration the curved functional side of the central panel faces an opposite direction from the curved functional sides of the multiple panels and when in the deployed position the curved functional side of the central panel faces a same direction as the curved functional sides of the multiple panels.

8. The antenna reflector array of claim 7, wherein the curved functional side of each of the multiple and central panels is a single curve; and further wherein when in the deployed position, the antenna reflector array is cylindrical.

9. The antenna reflector array of claim 7, wherein the curved functional side of each of the multiple and central panels is a double curve; and further wherein when in the deployed position the antenna reflector array is a surface of revolution such as a paraboloid.

10. The antenna reflector array of claim 6, wherein the functional side of each of the multiple and central panels is flat; and further wherein when in the deployed position the antenna reflector array is flat.

11. The antenna reflector array of claim 6, wherein when in the stacked configuration, all of the multiple panels are stacked below the central panel and deployment of the multiple panels occurs from the outermost panel in the stack to the innermost panel in the stack with respect to the central panel.

12. The antenna reflector array of claim 6, wherein when in the stacked configuration, at least one of the multiple panels is stacked above the central panel and remaining multiple panels are stacked below the central panel.

13. The antenna reflector array of claim 6, wherein when in the stacked configuration, each of the multiple panels is concentrically aligned with the central panel.

14. The antenna reflector array of claim 6, wherein when in the stacked configuration, the stack is staggered and a first edge of each of the multiple panels is offset a distance $D_o$ from a first edge of the central panel and an offset distance $D_o$ is different for each of the multiple panels.

15. The antenna reflector array of claim 14, wherein the offset distance $D_o$ for each of the multiple panels is equal to a vertical distance $D_v$ between each of the multiple panels and the central panel in the stack.

16. The antenna reflector array of claim 1, wherein when in the compact configuration, each of the multiple panels is held at an approximately 90 degree angle to the central panel by the at least one of the heat actuated flexible hinges.

* * * * *